US012565018B2

(12) United States Patent
Pantoja et al.

(10) Patent No.: US 12,565,018 B2
(45) Date of Patent: Mar. 3, 2026

(54) MANUFACTURING SYSTEM TO FORM A HONEYCOMB CORE AND A METHOD OF FORMING THE SAME

(71) Applicant: The Boeing Company, Arlington, VA (US)

(72) Inventors: Marcos Pantoja, Saint Louis, MO (US); Gwen Marie Lanphere Gross, Redmond, WA (US); Jeffrey E. Polus, Hillsboro, IL (US)

(73) Assignee: The Boeing Company, Arlington, VA (US)

( * ) Notice: Subject to any disclaimer, the term of this patent is extended or adjusted under 35 U.S.C. 154(b) by 229 days.

(21) Appl. No.: 18/481,963

(22) Filed: Oct. 5, 2023

(65) Prior Publication Data

US 2025/0115016 A1 Apr. 10, 2025

(51) Int. Cl.
| | |
|---|---|
| *B29D 24/00* | (2006.01) |
| *B31D 3/02* | (2006.01) |
| *B32B 3/12* | (2006.01) |
| *B32B 3/26* | (2006.01) |
| *B32B 29/00* | (2006.01) |
| *B32B 29/06* | (2006.01) |

(52) U.S. Cl.
CPC ........... *B29D 24/005* (2013.01); *B31D 3/023* (2013.01); *B32B 3/12* (2013.01); *B32B 3/266* (2013.01); *B32B 29/005* (2013.01); *B32B 29/06* (2013.01); *B32B 2255/12* (2013.01)

(58) Field of Classification Search
CPC .... B29D 24/005; B31D 3/023; B31D 3/0292; B32B 3/12; B32B 3/266; B32B 29/005; B32B 29/06; B32B 2255/12

USPC ................................. 156/197, 548, 512, 202
See application file for complete search history.

(56) References Cited

U.S. PATENT DOCUMENTS

| | | | |
|---|---|---|---|
| 2,401,885 A | 6/1946 | Semon | |
| 2,648,371 A * | 8/1953 | Goodwin | B31D 3/023 |
| | | | 156/496 |
| 3,458,385 A * | 7/1969 | Bova | B31D 3/0276 |
| | | | 428/137 |

(Continued)

OTHER PUBLICATIONS

YouTube video at https://www.youtube.com/watch?v=XWfzBtwcgHI; 19 pages of screenshots from the video; accessed on Jun. 3, 2024.

(Continued)

*Primary Examiner* — Cynthia L Schaller
(74) *Attorney, Agent, or Firm* — Harrity & Harrity, LLP

(57) ABSTRACT

A manufacturing system to form a honeycomb core and a method of forming the same includes a sheet of fibrous material is fed into a perforation assembly. The sheet of fibrous material is perforated via the perforation assembly to form holes through the sheet of fibrous material. The sheet of fibrous material is cut to form layers. The layers are stacked on top of each other such that the holes of the layers align with each other and strips of adhesive bond the respective layers together to form a perforated stack. A coating is applied to the sheet of fibrous material at the holes. The perforated stack is expanded to form a honeycomb panel. The honeycomb panel is dipped in a solution, and the coating repels the solution. The solution adheres to the honeycomb panel except at the holes where the coating is applied to form the honeycomb core.

24 Claims, 13 Drawing Sheets

(56) References Cited

U.S. PATENT DOCUMENTS

| 6,153,687 A | * | 11/2000 | Wang | ................. | B29D 99/0089 |
| | | | | | 524/391 |
| 2020/0307135 A1 | * | 10/2020 | Wilde | ................ | B29D 99/0021 |

OTHER PUBLICATIONS

YouTube video at https://www.youtube.com/watch?v=TphD2CNFr58; 19 pages of screenshots from the video; accessed on Jun. 3, 2024.

* cited by examiner

MANUFACTURING SYSTEM TO FORM A HONEYCOMB CORE AND A METHOD OF FORMING THE SAME

BACKGROUND

Fabrication of various composite sandwich structures may include a honeycomb core that is perforated with holes to facilitate the removal of air and volatiles trapped within cells of the honeycomb core. Therefore, when manufacturing these composite structures, the honeycomb core is vented prior to bonding composite face sheets over the honeycomb core. A phenolic coating process is used to strengthen stacked sheets of paper, which form the honeycomb core. If the holes are added prior to the phenolic coating process, the holes may become filled with phenolic resin during the phenolic coating process which plugs the respective holes, and thus, may affect venting of the honeycomb core. Therefore, in other processes, the holes in the honeycomb core are drilled through sides of the honeycomb core after the phenolic coating process to avoid plugging of the holes. However, debris may be formed via the drilling process which may contaminate various surfaces of the honeycomb core, and thus, affect other processes of the fabrication of the composite sandwich structure. Also, accessibility to drill the holes may be limited based on the size of the honeycomb core, and drilling the holes may be cost inhibitive based on the size of the honeycomb core. In addition, depending on the size of the holes, undesirable structural features may occur to the honeycomb core from the drilling process.

SUMMARY

Therefore, it is desirable to develop a manufacturing system and a method of forming a honeycomb core that may be perforated prior to a coating process that strengthens the honeycomb core and which eliminates drilling holes through the honeycomb core after the coating process, and thus, also reduces debris and undesirable structural features during fabrication.

The present disclosure provides a method of forming a honeycomb core. A sheet of fibrous material is fed into a perforation assembly. The sheet of fibrous material has a plurality of strips of adhesive thereon. The sheet of fibrous material is perforated via the perforation assembly to form a plurality of holes through the sheet of fibrous material. A plurality of strips of adhesive are applied to the fibrous material, and the holes are spaced apart from the strips of adhesive. The sheet of fibrous material is cut to form a plurality of layers. The layers are stacked on top of each other such that the holes of the layers align with each other and the strips of adhesive bond the respective layers together to form a perforated stack. A coating is applied to the sheet of fibrous material at the holes. The perforated stack is expanded to form a honeycomb panel. The honeycomb panel is dipped in a solution, and the coating repels the solution. Therefore, the solution adheres to the honeycomb panel except at the holes where the coating is applied to form the honeycomb core.

The present disclosure provides a manufacturing system to form a honeycomb core. The system includes a perforation assembly configured to receive a sheet of fibrous material and perforate the sheet of fibrous material to form a plurality of holes through the sheet of fibrous material. The sheet of fibrous material has a plurality of strips of adhesive thereon. The holes are spaced apart from the strips of adhesive. The system includes a cutting apparatus configured to cut the sheet of fibrous material to form a plurality of layers. The system also includes a stacking apparatus configured to stack the layers on top of each other such that the holes of the layers align with each other and the strips of adhesive bond the respective layers together to form a perforated stack. The system further includes a coating applied to the sheet of fibrous material at the holes. Additionally, the system includes an expansion apparatus configured to expand the perforated stack to form a honeycomb panel. The system also includes a container configured to contain a solution and receive the honeycomb panel. The coating repels the solution, and the solution adheres to the honeycomb panel except at the holes where the coating is applied to form the honeycomb core.

The detailed description and the drawings or FIGS. are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

Figure 1A:
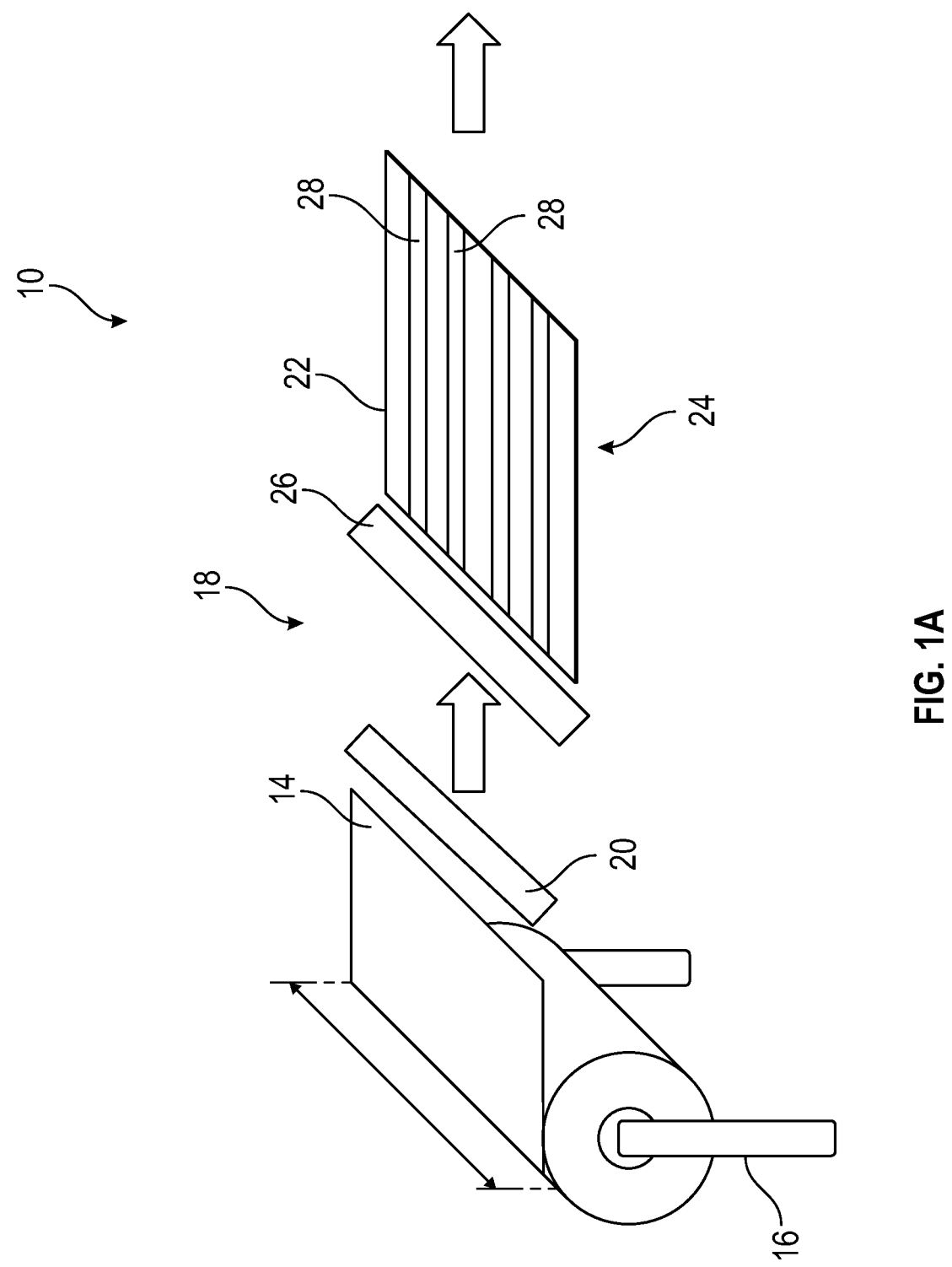
FIG. 1A-1F is a schematic illustration of a manufacturing system having a plurality of stations to form a honeycomb core.

The present disclosure may be extended to modifications and alternative forms, with representative configurations shown by way of example in the drawings and described in detail below. Inventive aspects of the disclosure are not limited to the disclosed configurations. Rather, the present disclosure is intended to cover modifications, equivalents, combinations, and alternatives falling within the scope of the disclosure as defined by the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Moreover, terms such as "first," "second," "third," and so on, may be used to describe separate components. Such terminology may include the words specifically mentioned above, derivatives thereof, and words of similar import. Furthermore, the term "substantially" can refer to a slight imprecision or slight variance of a condition, quantity, value, or dimension, etc., some of which are within manufacturing variance or tolerance ranges.

As used herein, an element or step recited in the singular and preceded by the word "a" or "an" should be understood as not necessarily excluding the plural of the elements or steps. Further, any reference to "one configuration" is not intended to be interpreted as excluding the existence of additional configurations that also incorporate the recited features. Moreover, unless explicitly stated to the contrary, configurations "comprising" or "having" an element or a plurality of elements having a particular property may include additional elements not having that property. The phrase "at least one of" as used herein should be construed to include the non-exclusive logical "or", i.e., A and/or B and so on depending on the number of components.

Referring to the figures, wherein like numerals indicate like or corresponding parts throughout the several views, a manufacturing system 10 is generally shown in FIG. 1A-1F.

As will be detailed further below, the manufacturing system 10 is used to form a honeycomb core 12, and ultimately be used to fabricate a composite sandwich structure. Therefore, the manufacturing system 10 may be used to fabricate the honeycomb core 12 as well as the composite sandwich structure.

Generally, the composite sandwich structure may be part of a vehicle or any other suitable movable or non-movable platform. In certain configurations, the vehicle may be an aircraft, a drone, a train, a car, a truck, a payload, a watercraft, or any other suitable movable platform. In other configurations, the non-movable platform may be a wind turbine, a building, etc. Therefore, non-limiting examples of the composite sandwich structure may include skins, panels, walls, ducts, equipment enclosure, structural panels, flight controls, leading edges, trailing edges, engine nacelles, interiors, aircraft interiors, overhead bins, propellers of the wind turbine, building materials, outer building cladding, doors, dividing walls, floor panels, etc., which may be externally disposed on the vehicle or internally disposed in the vehicle.

Generally, the manufacturing system 10 includes a sheet of fibrous material 14, which may be in a roll form, and supported via a support 16. The sheet of fibrous material 14 is used to fabricate the honeycomb core 12. As such, as the fibrous material 14 is needed to fabricate the honeycomb core 12, the sheet of fibrous material 14 is unrolled to the desired amount of fibrous material 14. In certain configurations, the sheet of fibrous material 14 may include paper, fabric, or any random orientated fibrous material. Therefore, in certain configurations, the sheet of fibrous material 14 is further defined as non-metallic paper. Non-limiting examples of the paper 14 includes Nomex® paper by DuPont; glass-reinforced paper, including fiberglass; carbon fiber reinforced plastic paper, Nomex® aramid reinforced paper, etc. One non-limiting example of the fabric 14 is glass fiber, Kevlar, Nomex®, etc. It is to be appreciated that any suitable type of fibrous material 14 may be used to form the honeycomb core 12.

The manufacturing system 10 also includes a cutting station 18, which includes a cutting apparatus 20 configured to cut the sheet of fibrous material 14 to form a plurality of layers 22. Depending on the desired configuration of the honeycomb core 12, the sheet of fibrous material 14 may be cut into one or more of the layers 22. The cutting apparatus 20 may include a cutter having one or more blades, one or more lasers, one or more blasting media, etc.; a platform to lay the sheet of fibrous material 14 across; one or more holders to secure the sheet of fibrous material 14 relative to the cutter; and any other suitable components to perform the cutting process.

The manufacturing system 10 may also include an adhesive station 24, which includes an adhesive applicator 26 configured to apply an adhesive to the sheet of fibrous material 14. In certain configurations, the sheet of fibrous material 14 has a plurality of strips of adhesive 28 thereon. That is, the adhesive applicator 26 is configured to apply the adhesive in strips spaced from each other to form the strips of adhesive 28. Therefore, each of the strips of adhesive 28 may be spaced from each other across the fibrous material 14. The adhesive 28 may be any suitable adhesive to bond the layers 22 together, and non-limiting examples of the adhesive 28 may include phenolics, epoxies, polyimides, polyaimide-imide, acrylic, polyester adhesive, etc.

The adhesive applicator 26 may be any suitable configuration, and non-limiting examples, may be a brush, a roller, a sponge, a tube, a sprayer, etc. Therefore, the adhesive applicator 26 may include a plurality applicator portions disposed in the desired locations relative to the sheet of fibrous material 14 to apply the adhesive 28 in the strips across the fibrous material 14.

Figure 1B:
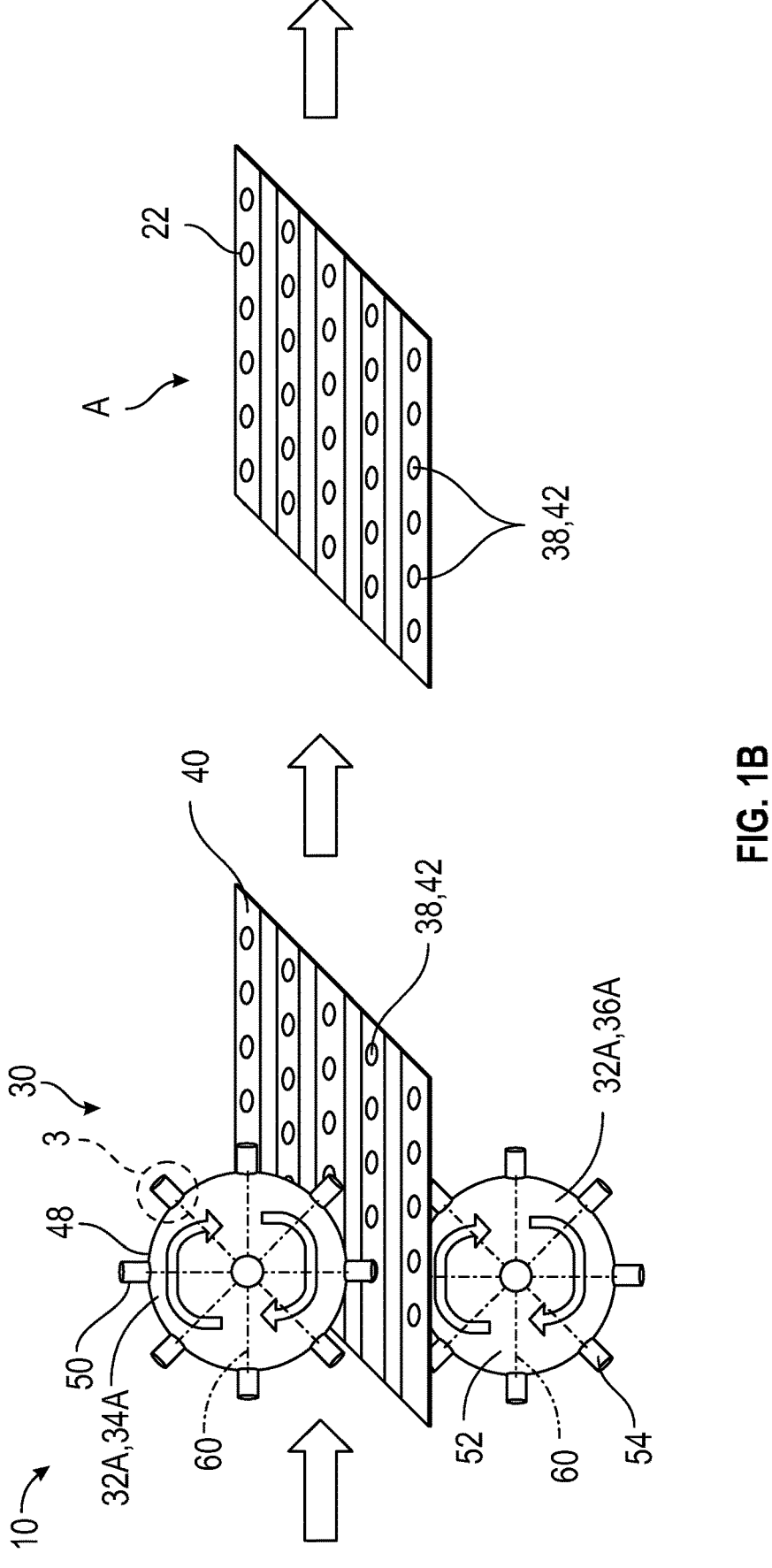

The adhesive 28 may be applied prior to cutting the sheet of fibrous material 14 into each of the layers 22 or applied after cutting the sheet of fibrous material 14 into the layers 22. As shown in FIGS. 1A-1B, in one suitable example, the adhesive 28 is applied after cutting the sheet of fibrous material 14 into each of the layers 22.

The manufacturing system 10 includes a perforating and coating station 30 (see FIGS. 1B, 4, and 8), which perforates the fibrous material 14 as well as coats the fibrous material 14 in this process. Therefore, at the perforating and coating station 30, the manufacturing system 10 includes a perforation assembly 32A, 32B, 32C configured to receive the sheet of fibrous material 14, and, in certain configurations, the perforation assembly 32A, 32B, 32C receives each of the layers 22 of the fibrous material 14. When referring to the sheet of fibrous material 14 at this station, this may include the fibrous material 14 prior to or after cutting. Therefore, regardless of whether the fibrous material 14 is cut or not, the perforating and coating station 30 operates the same. Also, in certain configurations, the adhesive station 24 may be disposed after the perforating and coating station 30.

Figure 4:
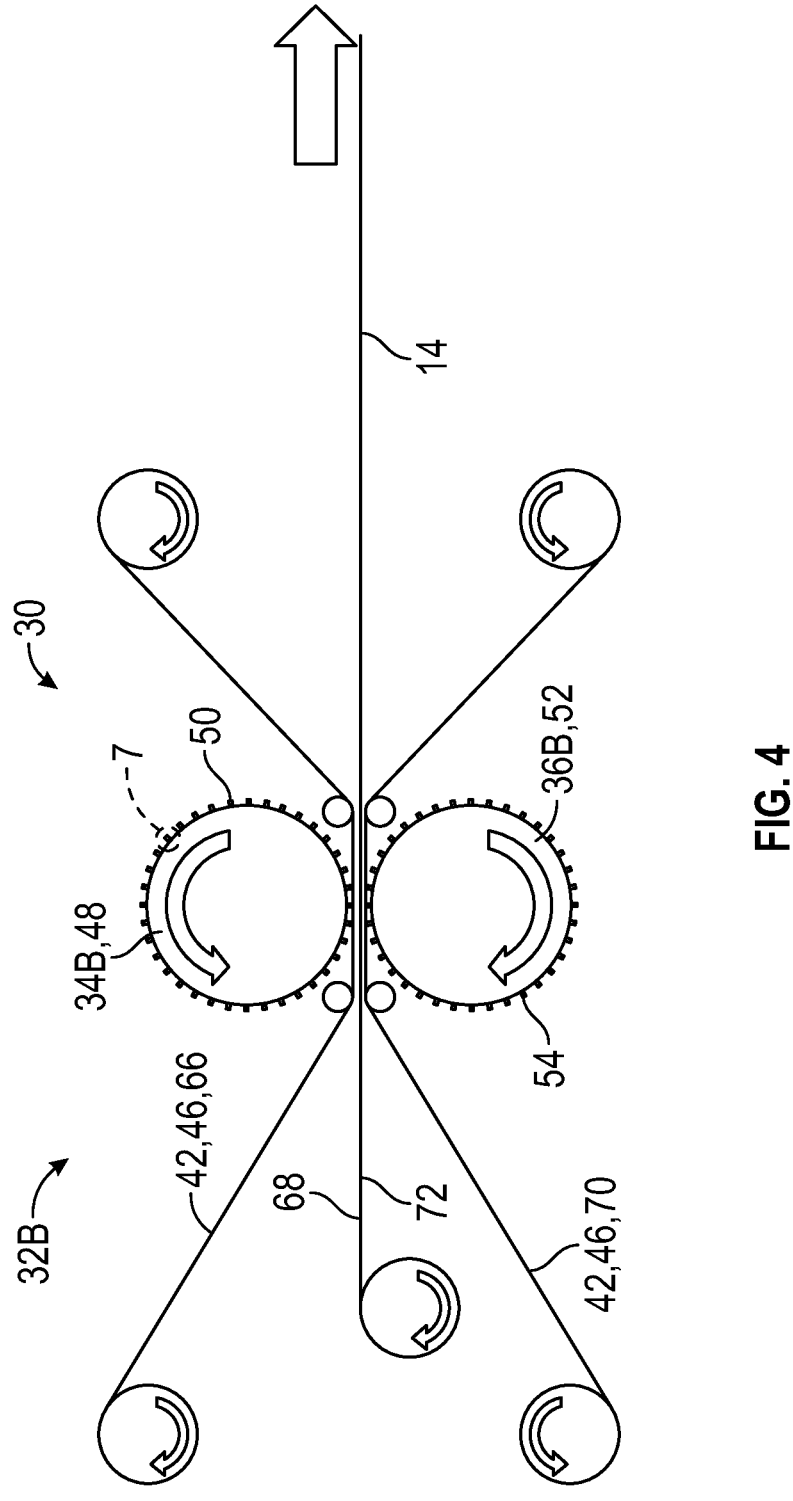
FIG. 4 is a schematic illustration of the manufacturing system including a perforation assembly of another configuration applying a first film layer and a second film layer to a sheet of fibrous material.

Generally, referring to FIGS. 1B and 4, the perforation assembly 32A, 32B may be further defined as a die assembly 32A, 32B including a male die 34A, 34B and a female die 36A, 36B. The sheet of fibrous material 14 is fed into the die assembly 32A, 32B between the male die 34A, 34B and the female die 36A, 36B to perforate the sheet of fibrous material 14 to form a plurality of holes 38 through the sheet of fibrous material 14. Optionally, for any of the configurations herein, a blower may be disposed adjacent to the perforation assembly 32A, 32B, 32C to move the perforated pieces of the cut fibrous material scrap and/or the burnt fibrous material scrap away from the sheet of fibrous material 14.

Generally, the holes 38 are spaced apart from the strips of adhesive 28. That is, the fibrous material 14 is perforated in strips 40 along non-adhesive locations of the fibrous material 14. As such, the strips 40 of the holes 38 and the strips of adhesive 28 may alternate across the fibrous material 14. Therefore, the male die 34A, 34B and the female die 36A, 36B align with the strips 40 along the non-adhesive locations, i.e., the male die 34A, 34B and the female die 36A, 36B are spaced from the strips of adhesive 28. Depending on the number of strips 40 to be perforated, a corresponding number of the male and female dies 34A, 34B, 36A, 36B will be used. Therefore, even though FIGS. 1B and 4 each illustrate one male die 34A, 34B and one female die 36A, 36B, there would be a plurality of male dies 34A, 34B and a plurality of female dies 36A, 36B, with one male die 34A, 34B and one associated female die 36A, 36B aligned with respective one of the strips 40. It is to be appreciated that any suitable number of male dies 34A, 34B and female dies 36A, 36B may be used.

Figure 5:
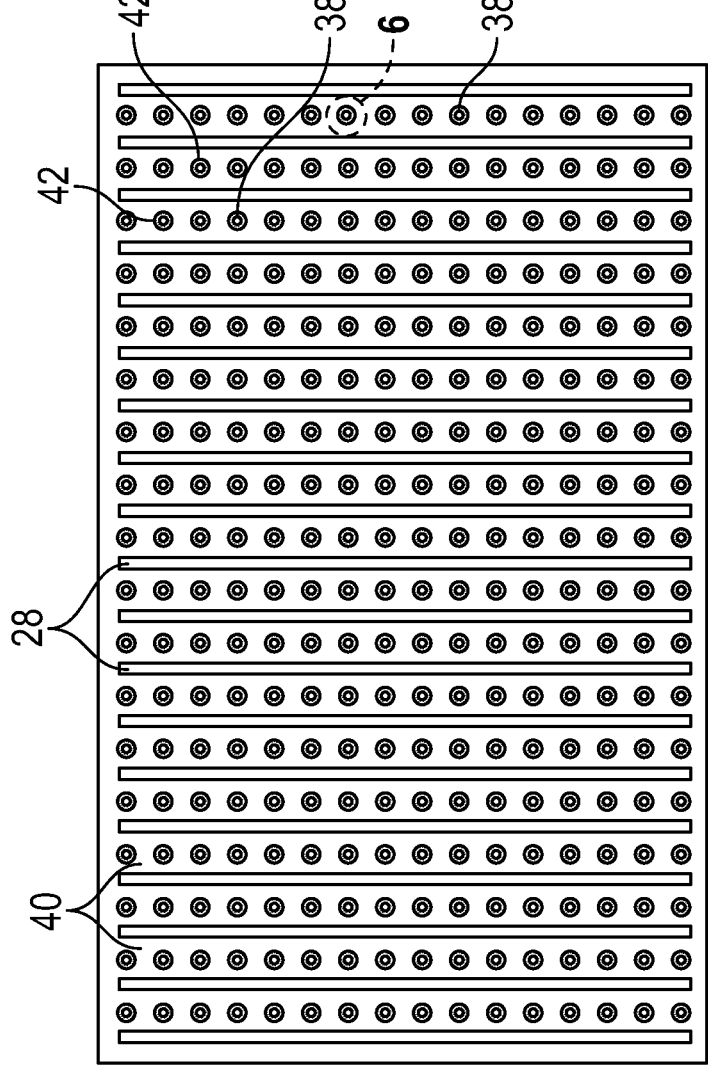
FIG. 5 is a schematic top side view of the sheet of fibrous material after applying the first film layer and the second film layer of FIG. 4.

In the example of FIG. 1B, once the sheet of fibrous material 14 is perforated, the perforated layer 22 is shown at A. Continuing with the perforated layer 22 shown at A, in this example, there are five strips 40 of the holes 38, and there are four strips of adhesive 28. Therefore, for this example, to form five strips 40 of holes 38, there are five male dies 34A and correspondingly five female dies 36A, or the first housing 48 is elongated and supports five spaced apart groups of the male punch dies 50 and the second housing 52 is elongated and supports five spaced apart groups of the female punch dies 54. The same concept applies to the configuration of the die assembly 32B of FIG. 4, in which FIG. 5 illustrates eighteen strips 40 of holes 38, and therefore, eighteen male dies 34B and correspondingly eighteen female dies 36B may be used or the first housing 48 is elongated and supports eighteen spaced apart groups of the male punch dies 50 and the second housing 52 is elongated and supports eighteen spaced apart groups of the female punch dies 54.

Continuing with the perforating and coating station 30, the manufacturing system 10 also includes a coating 42 applied to the sheet of fibrous material 14 at the holes 38. The coating 42 is applied to the sheet of fibrous material 14 or each of the layers 22 of the fibrous material 14 as the holes 38 are created. Therefore, the coating 42 is spaced from the strips of adhesive 28.

The coating 42 may be applied using any suitable way, and non-limiting examples to apply the coating 42 are described herein. FIGS. 1B and 4 illustrate different ways to apply the coating 42, and it is to be appreciated that the die assembly 32A as illustrated in FIG. 1B may be replaced by the die assembly 32B as illustrated in FIG. 4.

Generally, for any configuration herein, the coating 42 may be formed of any suitable configuration, but the coating 42 is configured to repel a substance in another process which is discussed further below. Therefore, the coating 42 is configured to adhere to the fibrous material 14 at the holes 38, so that the coating 42 remains on the fibrous material 14 to repel the substance applied to the fibrous material 14 in a later process. One non-limiting example of the coating 42 is a repellant coating, including a phenolic-repellant coating. The coating 42 may be in different forms, and non-limiting examples include liquid fluid 44, film 46, etc.

As discussed above, in certain configurations, the coating 42 may be the liquid fluid 44. Non-limiting examples of the liquid fluid 44 may include a repellant, such as a phenolic-repellant fluid, polytetrafluoroethylene (PTFE), Teflon®, polyolefin, hydrocarbon wax, silicone, surfactant, polyethylene glycol, alkadiene-acryl amide copolymers, polydimethylsiloxane (PDMS), polysimethylsiloxanedipamide (PDMSA), etc.

In other configurations, as discussed above, the coating 42 may be the film 46. Non-limiting examples of the film 46 may include a repellant, such as polytetrafluoroethylene (PTFE) sheet, Teflon sheet, mylar sheet, foil sheet, silicone sheet, polyolefin sheet, etc.

Generally, as shown in FIGS. 1B and 4, the male die 34A, 34B includes a first housing 48 and a plurality of male punch dies 50 extending out of the first housing 48, and the male punch dies 50 are spaced from each other around the first housing 48. Also, in these configurations, the female die 36A, 36B includes a second housing 52 and a plurality of female punch dies 54 extending out of the second housing 52, and the female punch dies 54 are spaced from each other around the second housing 52.

The male punch dies 50 and the female punch dies 54 are complementary to each other to punch or cut the fibrous material 14 therebetween. As such, the male punch dies 50 and the female punch dies 54 may each include a distal end portion 56 that performs the punching or cutting, with the distal end portion 56 of the male punch dies 50 being a diameter different from a diameter of the distal end portion 56 of the female punch dies 54. The male punch dies 50 and/or the female punch dies 54 may be hollow to allow the distal end portion 56 of the respective punch dies 50, 54 to enter the respective corresponding punch dies 50, 54. It is to be appreciated that FIG. 3 may be generally illustrative of any of the male and female punch dies 50, 54 extending from the associated first and second housings 48, 52, with the difference between the punch dies 50, 54 being the diameter of the distal end portion 56.

Figure 3:
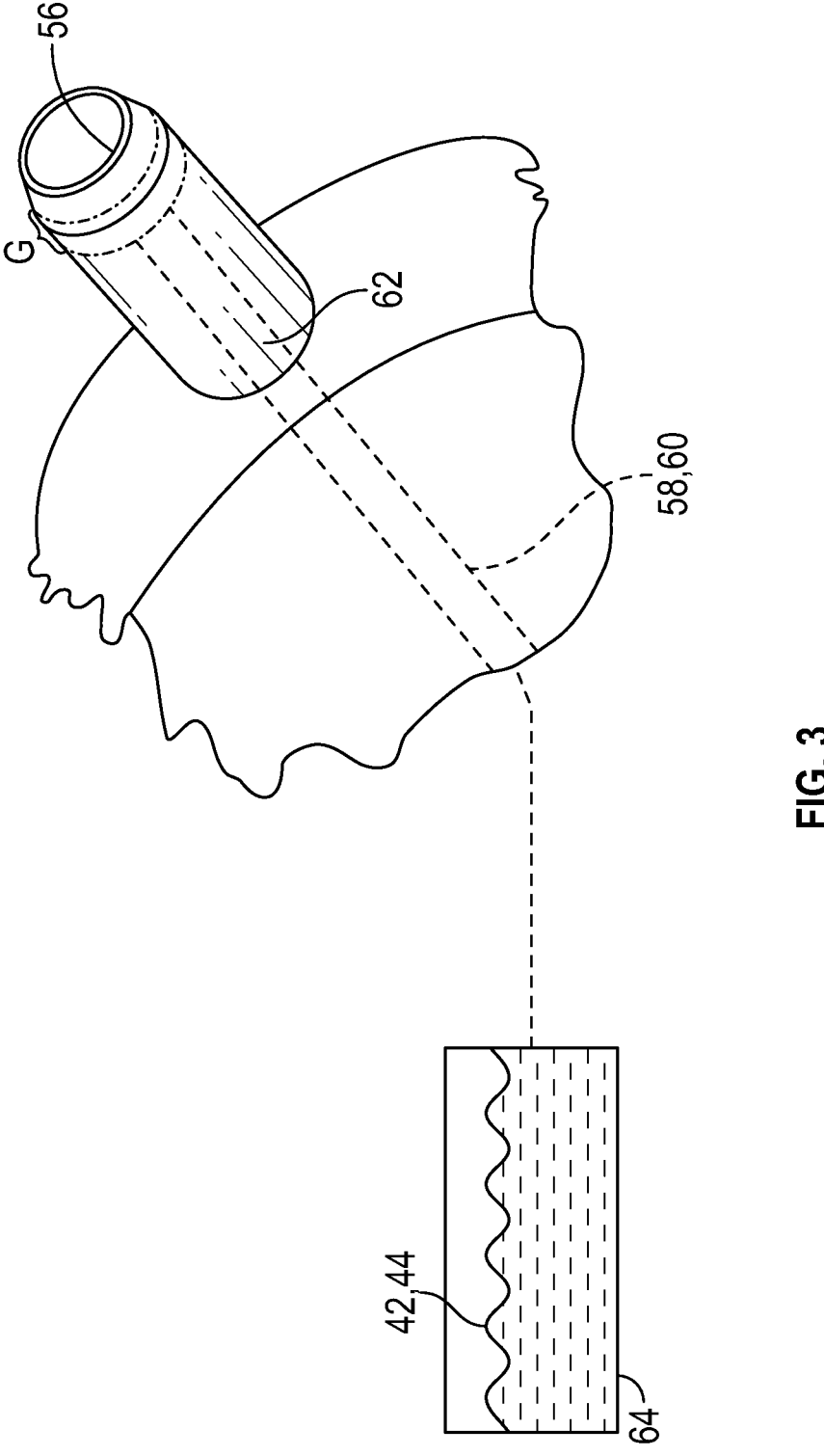
FIG. 3 is a schematic perspective view of an example punch die taken from line 3 of FIG. 1B.

In certain configurations, such as the configuration of FIGS. 1B and 3, at least one of the male die 34A and the female die 36A may include an outlet 58 configured to allow the coating 42 to exit out of the at least one of the male die 34A and the female die 36A during punching of the sheet of fibrous material 14 such that the coating 42 is applied to the sheet of fibrous material 14 at the holes 38. In certain configurations, the male die 34A includes the outlet 58, in another configuration, the female die 36A includes the outlet 58, and in yet another configuration, the male die 34A and the female die 36A each include the outlet 58.

When a plurality of punch dies 50, 54 are utilized, the outlet 58 may branch into to a plurality of pathways 60 that are connected to respective punch dies 50, 54. For illustrative purposes, example pathways 60 are illustrated in FIG. 1B as dash-dot-dash lines. For example, the pathways 60 may be connected to respective male punch dies 50, and the pathways 60 may feed the coating 42 through the male punch dies 50 such that when the respective male punch dies 50 engage the fibrous material 14, the coating 42 is applied to the fibrous material 14 at the hole 38. As another example, the pathways 60 may be connected to respective female punch dies 54, and the pathways 60 may feed the coating 42 through the female punch dies 54 such that when the respective female punch dies 54 engage the fibrous material 14, the coating 42 is applied to the fibrous material 14 at the hole 38. Referring to FIG. 3, the outlet 58 may connect to an outside surface 62 of the punch dies 50, 54 such that the coating 42 flows over the outside surface 62 of the punch dies 50, 54 at the distal end portion 56 such that the coating 42 is applied to the fibrous material 14 during the cutting process. That is, one of the punch dies 50, 54 is disposed outside of the other one of the punch dies 50, 54, during the cutting process of the holes 38, so that the outside surface 62 of one or both of the punch dies 50, 54 engages the fibrous material 14, and it is the outside surface 62 of the one or both of the punch dies 50, 54 that directly applies the coating to the fibrous material 14 at the holes 38.

Continuing with FIG. 3, the die assembly 32A may include a reservoir 64 that contains the coating 42 to be delivered to the punch dies 50, 54. The reservoir 64 may be in fluid communication with the outlet 58, and the pathways 60, to deliver the coating 42 to an exit of the outlet 58 at the punch dies 50, 54. In certain configurations, the coating 42 is gravity fed through the outlet 58, and more specifically, gravity fed through the pathways 60 to the exit of the outlet 58. In other configurations, the coating 42 may be fed through the outlet 58 via a pump. It is to be appreciated that the coating 42 may be fed through the outlet 58 in any other suitable way.

In certain configurations, the die assembly 32A may include an applicator disposed around the distal end portion 56 of the respective punch dies 50, 54. The applicator may be in fluid communication with the outlet 58 such that the coating 42 is fed from the outlet 58, and more specifically, to the distal end portion 56 of the outlet 58 to the applicator. Generally, the applicator is disposed around the outside surface 62 of one or both of the punch dies 50, 54 such that the applicator engages the fibrous material 14 during the cutting process to apply the coating 42 to the fibrous material 14. In certain configurations, the applicator may be one or more of pad(s), stamp(s), foam(s), cloth(s), etc.

It is desirable to apply the coating 42 completely around the holes 38 of the fibrous material 14 during the cutting process, and therefore, it is to be appreciated that the above discussion regarding how the coating 42 exits the punch dies 50, 54 will be sufficiently positioned around the outside surface 62 of the punch dies 50, 54 to completely coat the holes 38. FIG. 3 identifies an area G in dash-dot-dash lines, which is illustrative of the general location where the applicator may be disposed around the outside surface 62 of one or both of the punch dies 50, 54 to apply the coating 42 to the fibrous material 14 or to illustrate the general location where the coating 42 may exit one or both of the punch dies 50, 54 to flow across the outside surface 62 of the punch dies 50, 54. Since FIG. 3 is a perspective view, the back side of the outer surface 62 is not visible, but it is to be appreciated that the area G extends around the outside surface 62 of the punch dies 50, 54 to the other side that is not visible in FIG. 3.

Figure 9:
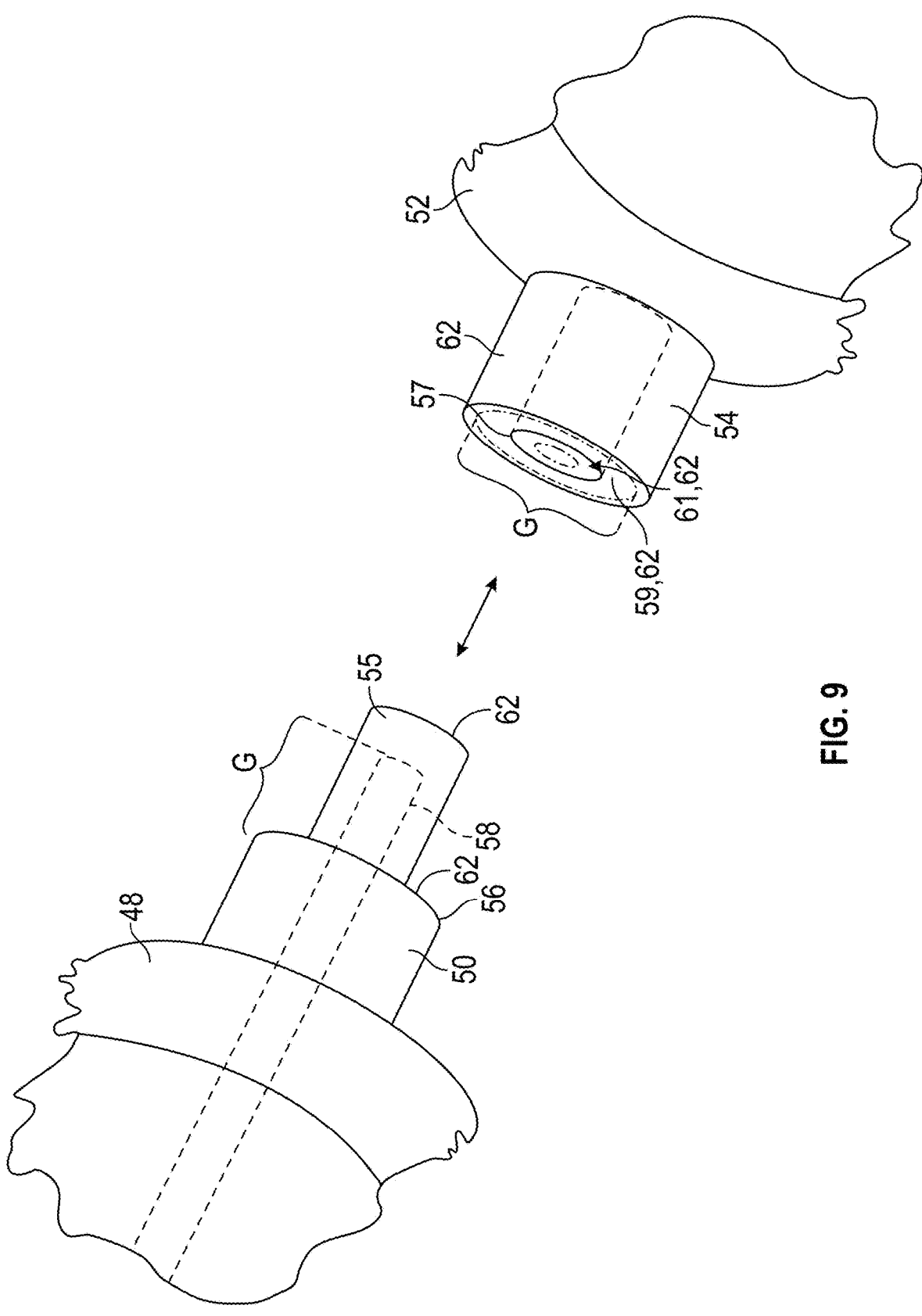
FIG. 9 is a schematic fragmented perspective view of another example male punch die and female punch die suitable for the configuration of FIG. 1B.

The punch dies 50, 54 may be other configurations from FIG. 3. For example, as shown in FIG. 9, the male punch dies 50 may include an anvil 55 and the female punch dies 54 may define an aperture 57. Therefore, as similarly discussed for the configuration of FIG. 3, one of the punch dies 50, 54 is hollow to allow the distal end portion 56 of the respective punch dies 50, 54 to enter the respective corresponding punch dies 50, 54. Specifically, in the configuration of FIG. 9, the anvil 55 of the male punch dies 50 enters the aperture 57 of the respective female punch dies 54. Also, the coating 42 may be delivered out to the outer surface 62 of the male punch dies 50 along the anvil 55, and therefore, the outlet 58 may exit to the outer surface 62 along the area G, as identified in FIG. 9.

Optionally, the punch dies 50, 54 of the configuration of FIG. 9 may include an applicator disposed around the distal end portion 56 of the respective punch dies 50, 54. The applicator may be in fluid communication with the outlet 58 such that the coating 42 is fed from the outlet 58, and more specifically, to the distal end portion 56 of the outlet 58 to the applicator. Generally, the applicator is disposed around the outside surface 62 of one or both of the punch dies 50, 54 such that the applicator engages the fibrous material 14 during the cutting process to apply the coating 42 to the fibrous material 14. Regarding the female punch dies 54 of FIG. 9, the outer surface 62 of the female punch dies 54 may include a distal edge 59 and a surface 61 inside of the aperture 57, and the coating 42 may exit the distal edge 59 and/or the surface 61, and/or the applicator may be disposed along the distal edge 59 and/or the surface 61. In certain configurations, the applicator may be one or more of pad(s), stamp(s), foam(s), cloth(s), etc. Since FIG. 9 is a perspective view, the back side of the outer surface 62 is not visible, but it is to be appreciated that the area G extends around the outside surface 62 of the male punch dies 50 to the other side that is not visible in FIG. 9, and the outer surface 62 of the female punch dies 54 may extend inside of the aperture 57 farther than what is visible in FIG. 9.

As discussed above, the coating 42 may be in different forms, and therefore, the die assembly 32A, 32B may be configured differently depending on the coating 42. Therefore, as another example, the coating 42 may be sprayed around the holes 38 when the holes 38 are formed, and in this configuration, the applicator may be a sprayer disposed proximal to the location that the holes 38 are being cut through the fibrous material 14 and after the holes 38 are punched the sprayer applies the coating 42 to the holes 38, and/or, the coating 42 may be sprayed around the outside surface 62 of the punch dies 50, 54 and when the punch dies 50, 54 cut the holes 38, the coating 42 is applied to the fibrous material 14. Therefore, the punch dies 50, 54 of FIGS. 3 and 9 may be configured to cut the holes 38 only, and a separate sprayer is used to coat the holes 38. As such, the punch dies 50, 54 of FIGS. 3 and 9 may be designed without the features to coat the holes 38 with the coating 42, and will not be illustrated in the figures separately.

Furthermore, as yet another example, in other configurations, such as the configuration of FIGS. 4-7, the coating 42 may be the film 46 instead of the liquid fluid 44 configurations discussed above. In this configuration, the coating 42 may include a first film layer 66 fed between the male die 34B and the female die 36B relative to a first side 68 of the sheet of fibrous material 14, and the coating 42 may include a second film layer 70 fed between the male die 34B and the female die 36B relative to a second side 72 of the sheet of fibrous material 14. Optionally, in this configuration, the cutting station 18 to form the layers 22 of fibrous material 14 is after the perforating and coating station 30. That is, in certain configurations, the holes 38 are punched and coated and then the fibrous material 14 is cut into the layers 22 at the cutting station 18, which are then stacked on top of each other as discussed below.

Figure 6:
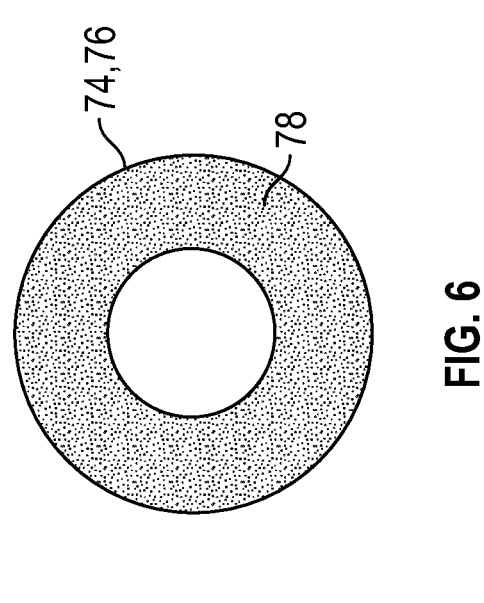
FIG. 6 is a schematic enlarged view of one of the film layers taken from line 6 of FIG. 5.

Referring to FIG. 5, the die assembly 32B may be configured to cut the first film layer 66, the second film layer 70, and the sheet of fibrous material 14 such that a cut portion of the first film layer 66 and a cut portion of the second film layer 70 is applied to the sheet of fibrous material 14 at the holes 38. FIG. 6 is illustrative of one non-limiting example configuration of the cut portion of the first film layer 66 and the second film layer 70. That is, FIG. 6 is illustrative of the film layer 66, 70 as applied to either of the sides 68, 72 of the sheet of fibrous material 14.

Figure 7:
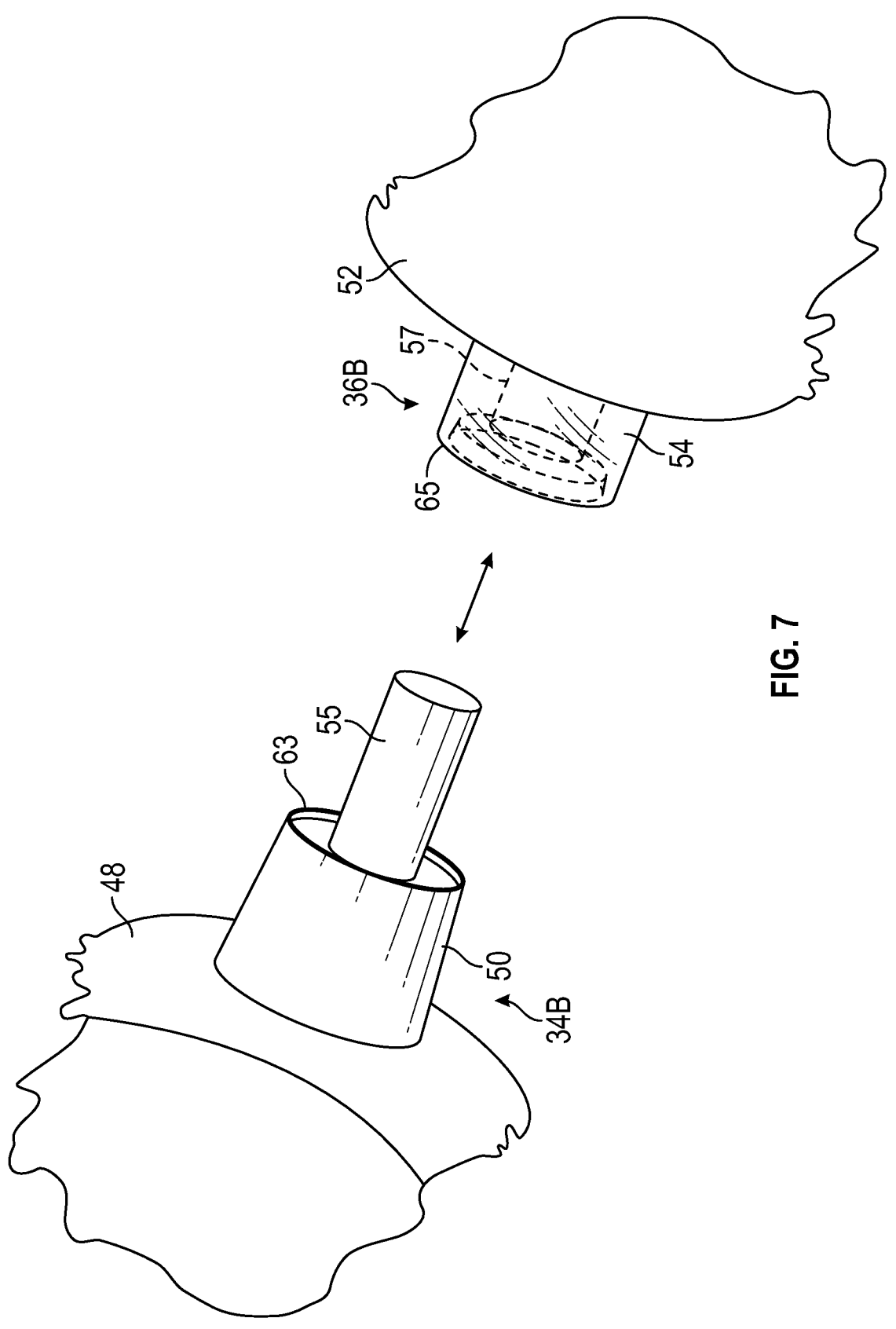
FIG. 7 is a schematic enlarged perspective view of an example male punch die and female punch die suitable for the configuration of FIG. 4.

The male die 34B and the female die 36B may be configured differently than the configuration in FIG. 1B, in that the features to deliver the liquid fluid 44 are eliminated. Therefore, briefly, as shown in FIG. 7, the male die 34B includes a first housing 48 and a plurality of male punch dies 50 extending out of the first housing 48, and the male punch dies 50 are spaced from each other around the first housing 48, which is similar to the configuration of FIG. 1B. Also, in this configuration as shown in FIG. 7, the female die 36B includes a second housing 52 and a plurality of female punch dies 54 extending out of the second housing 52, and the female punch dies 54 are spaced from each other around the second housing 52, which is similar to the configuration of FIG. 1B.

The male punch dies 50 and the female punch dies 54 are configured similarly to the features that punch or cut the fibrous material 14 of FIG. 9. As such, referring to FIG. 7, the male punch dies 50 may include an anvil 55 and the female punch dies 54 may define an aperture 57. Therefore, for the configuration of FIG. 7, one of the punch dies 50, 54 is hollow to allow the distal end portion 56 of the respective punch dies 50, 54 to enter the respective corresponding punch dies 50, 54. Specifically, in the configuration of FIG. 7, the anvil 55 of the male punch dies 50 enters the aperture 57 of the respective female punch dies 54, which cuts the fibrous material 14, the first film layer 66, and the second film layer 70. That is, the anvil 55 pierces each of the fibrous material 14, the first film layer 66, and the second film layer 70. It is to be appreciated that FIG. 7 may be generally illustrative of any of the male and female punch dies 50, 54 extending from the associated first and second housings 48, 52.

In addition, the first film layer 66 and the second film layer 70 may also be cut without cutting the fibrous material 14. That is, the first film layer 66 may be cut via the male die 34B to further form first coated tabs 74 and the second film layer 70 may be cut via the female die 36B to further form second coated tabs 76. Referring to FIG. 7, the male punch dies 50 may include a first cutting lip 63 that surrounds the anvil 55 which kiss cuts the first film layer 66 without cutting the fibrous material 14 via the first cutting lip 63 to form the first coated tabs 74, and similarly, the female punch dies 54 may include a second cutting lip 65 that surrounds the aperture 57 which kiss cuts the second film layer 70 without cutting the fibrous material 14 via the second cutting lip 65 to form the second coated tabs 76. In this cutting process, the first lip 63 forms an outer periphery of the first coated tabs 74 and the anvil 55 forms an inner periphery of the first coated tabs 74, and similarly, the second lip 65 forms an outer periphery of the second coated tabs 76 and the anvil 55 forms an inner periphery of the second coated tabs 76. Therefore, as best shown in FIG. 6, the first coated tabs 74 of the first film layer 66 and the second coated tabs 76 of the second film layer 70 may be cut into a ring configuration. It is to be appreciated that the first coated tabs 74 and the second coated tabs 76 may be any suitable configuration, and the ring configuration is one non-limiting example. The cut portions discussed above may be defined as the first coated tabs 74 and the second coated tabs 76.

Also, it is to be appreciated that the first coated tabs 74 of the first film layer 66 and the second coated tabs 76 of the second film layer 70 may be substantially the same as each other or different from each other. In certain configurations, cutting of the first film layer 66 and the second film layer 70 occurs simultaneously with perforating the sheet of fibrous material 14. Therefore, to perforate the fibrous material 14 to form the holes 38, the male die 34B and the female die 36B punch through the first film layer 66, the second film layer 70, and the fibrous material 14.

The first coated tabs 74 and the second coated tabs 76 may strength the fibrous material 14 around the holes 38. Optionally, the first film layer 66 and/or the second film layer 70 may include a texture 78. The texture 78 may assist in increasing repelling properties of the coating 42. For illustrative purposes, FIG. 6 illustrates speckling across the coated tab 74, 76 to indicate the texture 78. The texture 78 may be slits, raised surfaces, indentations, corrugations, surface etching, coatings, hydrophobic nano-coatings, nano hairs, etc.

Figure 8:
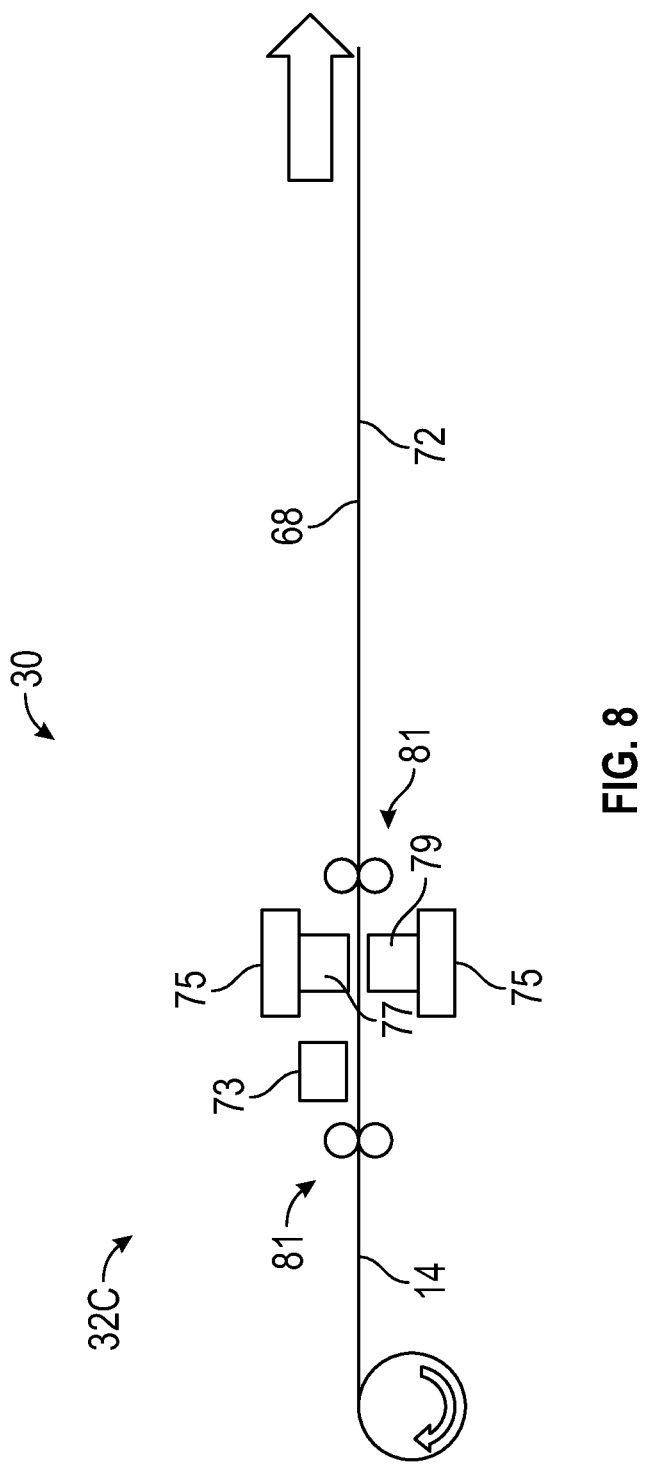
FIG. 8 is a schematic illustration of the manufacturing system including a perforation assembly of yet another configuration that uses a laser/coating assembly.

Turning to FIG. 8, the perforation assembly 32A, 32B, 32C may be further defined as a laser/coating assembly 32C including a laser device 73 and an applicator 75. The laser device 73 is configured to perforate the sheet of fibrous material 14 to form the holes 38 through the sheet of fibrous material 14. In certain configurations, the laser device 73 may be disposed adjacent to the first side 68 of the sheet of fibrous material 14 or disposed adjacent to the second side 72 of the sheet of fibrous material 14. In other configurations, the laser device 73 is disposed adjacent to the first side 68 and the second side 72 of the sheet of fibrous material 14. The laser device 73 may use a laser beam to burn, vaporize, and/or cut, etc., the sheet of fibrous material 14, in order to form the holes 38, i.e., perforate the fibrous material 14. The laser device 73 is positioned in a desired location relative to the sheet of fibrous material 14 such that the laser beam strikes the sheet of fibrous material 14 in the desired location to form the holes 38.

The applicator 75 is configured to apply the coating 42 to the sheet of fibrous material 14 at the holes 38. The applicator 75 is disposed adjacent to the first side 68 and the second side 72 of the sheet of fibrous material 14. That is, the applicator 75 may include a first applicator head 77 disposed along the first side 68 of the sheet of fibrous material 14 and a second applicator head 79 disposed along the second side 72 of the sheet of fibrous material 14. The first applicator head 77 and the second applicator head 79 may be used to apply the coating 42 to the fibrous material 14. In certain configurations, the first application portion 77 and the second applicator head 79 may align with each other on the opposite sides 68, 72 of the sheet of fibrous material 14, and apply the coating 42 to the fibrous material 14. The first applicator head 77 and the second applicator head 79 may spray the coating 42 on the fibrous material 14 and/or use a sponge, a roller, a brush, etc. to touch the fibrous material 14 to apply the coating 42. Optionally, a plurality of rollers 81 may be disposed along the sheet of fibrous material 14 to guide, support, and/or position of the sheet of fibrous material 14 relative to the applicator 75 for the perforating and coating process 30.

Regardless of the configuration, the adhesive station 24 may optionally be disposed after the perforating and coating station 30, such that the strips of adhesive 28 are applied to the sheet of fibrous material 14 after perforating and coating the holes 38. Next, the manufacturing system 10 further includes a stacking station 80, in which each of the layers 22 are stacked on each other. Therefore, after the fibrous material 14 has been perforated and cut, and the strips of adhesive 28 have been applied to the fibrous material 14, the layers 22 are stacked. As such, the manufacturing system 10 further includes a stacking apparatus 82 configured to stack the layers 22 on top of each other such that the holes 38 of the layers 22 align with each other and the strips of adhesive 28 bond the respective layers 22 together to form a perforated stack 84. The stacking apparatus 82 may include any suitable components to perform the stacking, and for example, may include a platform to stack the layers 22, one or more arms with an end effector to pick and place the layers 22, etc.

By stacking the layers 22, the adhesive on one side of one of the layers 22 bonds to another side of another one of the layers 22, and so on for the number of stacked layers 22. The adhesive may cure over time to bond the layers 22 together.

In certain configurations, depending on the type of adhesive being used, the perforated stack 84 may optionally use one or more other processes to cure the adhesive.

Figure 1C:
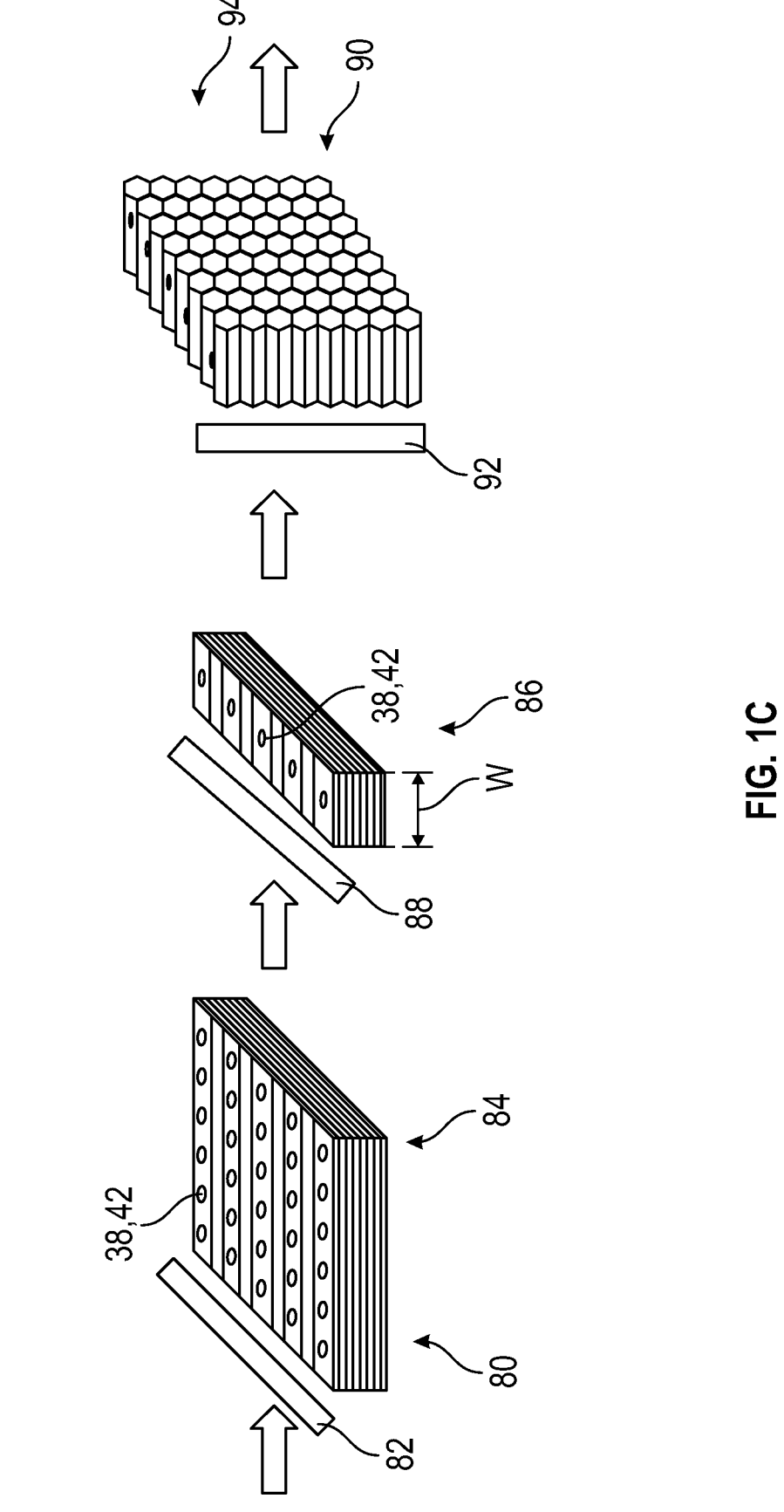

Next, the manufacturing system 10 may include a second cutting station 86, in which the perforated stack 84 may be cut into a width W (see FIG. 1C). Therefore, at this station 86, each of the layers 22 and each of the strips of adhesive 28 are cut into the width W. The second cutting station 86 may include a second cutting apparatus 88, which may include a cutter having one or more blades, one or more lasers, one or more blasting media, etc.; a platform to lay the perforated stack 84 on; one or more holders to secure the perforated stack 84 relative to the cutter; and any other suitable components to perform the second cutting process.

Continuing with FIG. 1C, the manufacturing system 10 also includes an expansion station 90, which is used to expand the perforated stack 84 after the desired width W of the perforated stack 84 is obtained. Therefore, the manufacturing system 10 further includes an expansion apparatus 92 configured to expand the perforated stack 84 to form a honeycomb panel 94. The adhesive of the strips of adhesive 28 of the honeycomb panel 94 is cured prior to expanding the honeycomb panel 94 at the expansion station 90.

Figure 1D:
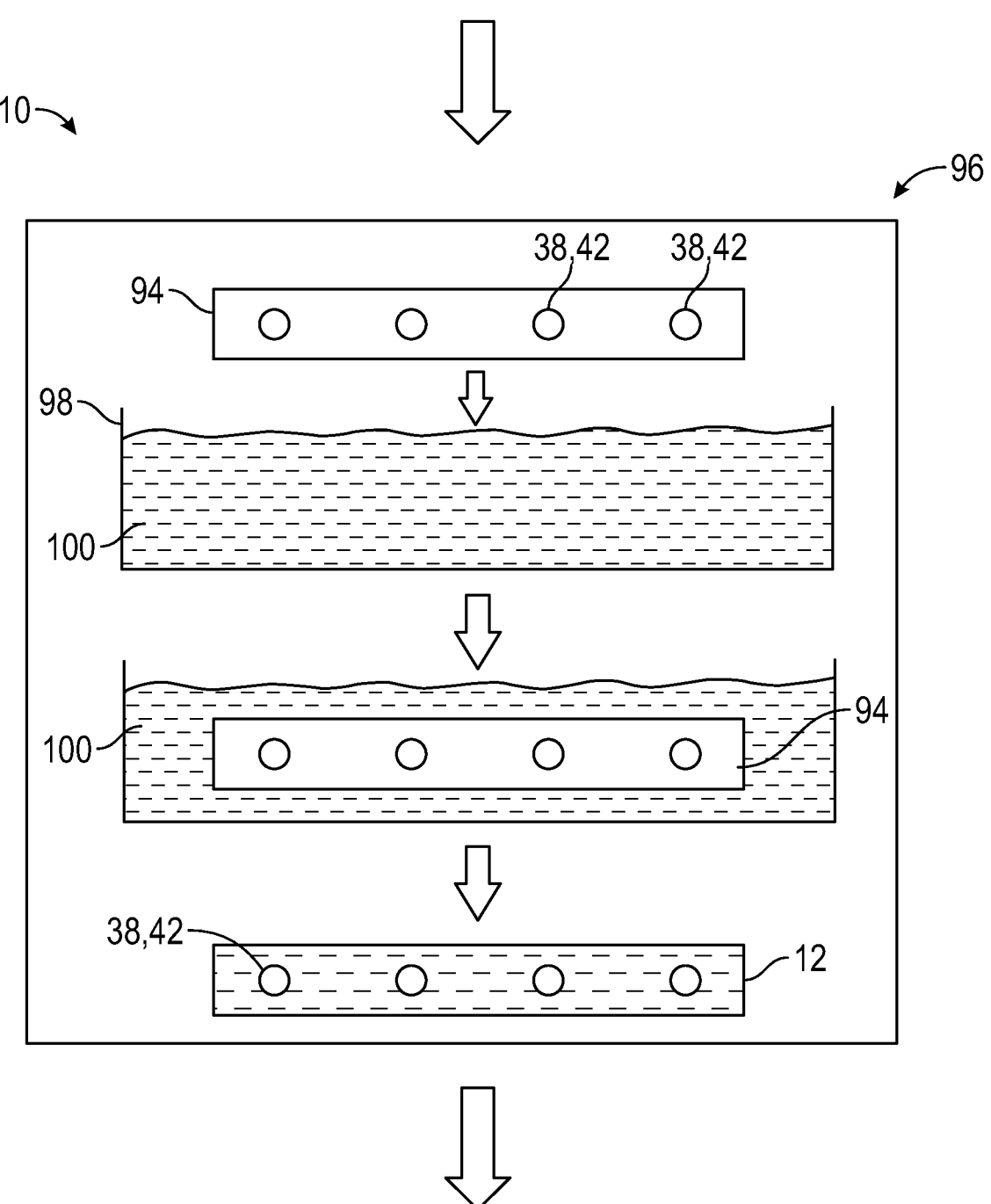

Once the honeycomb panel 94 is expanded, the honeycomb panel 94 is ready to be coated with the substance, which is mentioned above. Therefore, the manufacturing system 10 further includes a second coating station 96 as shown in FIG. 1D. At this station, the manufacturing system 10 includes a container 98 configured to contain a solution 100 and receive the honeycomb panel 94. The substance mentioned above is the solution 100 in this process.

Continuing with FIG. 1D, the honeycomb panel 94 is dipped into the container 98 containing the solution 100 to coat the honeycomb panel 94, and once removed from the solution 100, the honeycomb panel 94 is cured to form the honeycomb core 12. FIG. 1D illustrates the honeycomb panel 94 before being dipped into the solution 100, dipped into the solution 100, and after being dipped in the solution 100 (the after being dipped is distinguished from the before being dipped in FIG. 1D via the honeycomb core 12 being dashed with evenly spaced dashed lines for illustrative purposes, which visually shows the difference therebetween) The solution 100 adds rigidity and/or strengthens the honeycomb core 12 for the next process.

Due to the viscosity of the solution 100 and the diameter of the holes 38 (the holes 38 are small sized) being perforated, a large surface tension and/or a capillary force occurs around the periphery of the holes 38, which may cause the solution 100 to clog the holes 38 if the coating 42 is not applied to the holes 38. However, in this design, the coating 42 (applied at the perforating and coating station 30) repels the solution 100 (applied at the second coating station 96), and the solution 100 (applied at the second coating station 96) adheres to the honeycomb panel 94 except at the holes 38 where the coating 42 is applied to form the honeycomb core 12, thus, the holes 38 remain open. That is, the coating 42 applied at the holes 38 repels the solution 100 to prevent the holes 38 from being clogged via the solution 100. To maximize rigidity and/or strength of the honeycomb core 12, the coating 42 that repels the solution 100 is applied to the periphery of the holes 38, and does not extend any appreciable distance onto walls 102 of the honeycomb core 12.

The solution 100 applied to the honeycomb panel 94 may be resin, and non-limiting examples of the solution 100 may include a phenolic resin, epoxies, bismaleimides, polyimides, polyamide-imides, etc. Again, by having the coating 42 that repels the solution 100 disposed in the holes 38, the solution 100 does not clog the holes 38, and thus, the holes 38 remain open to allow gaseous fluid to flow therethrough in yet another process discussed below.

Figure 1E:
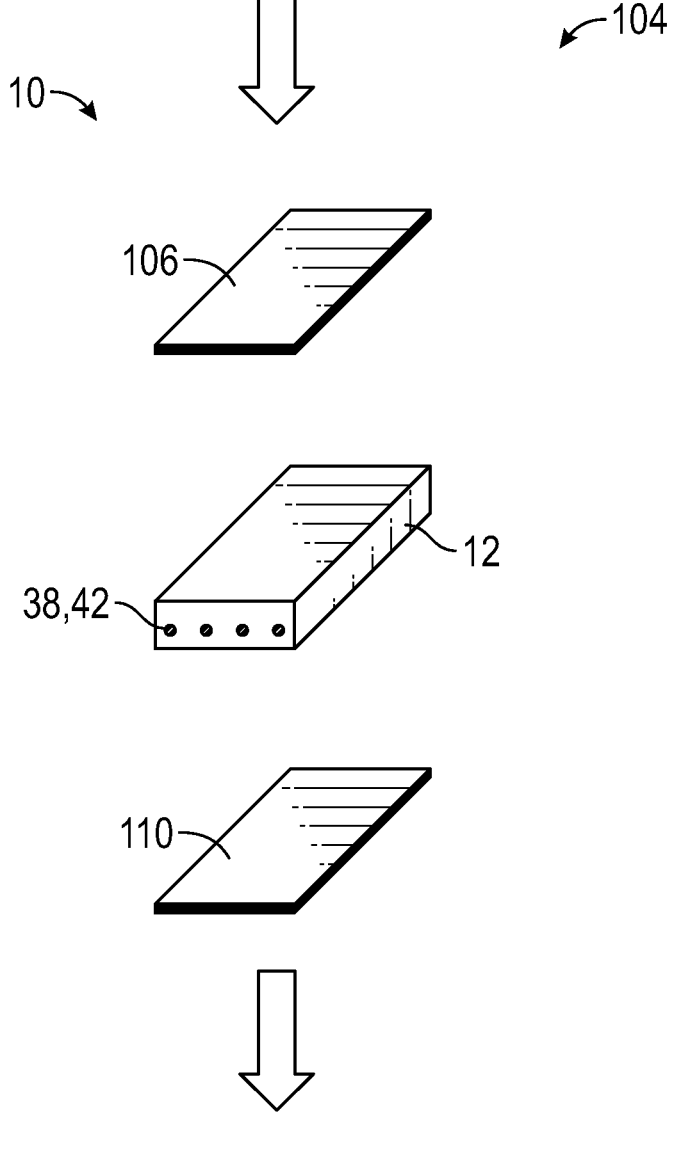

Once the honeycomb panel 94 has cured into the honeycomb core 12, the honeycomb core 12 may move to an assembly station 104 (see FIG. 1E). At this station, a first face sheet 106 may be bonded to a first side surface 108 of the honeycomb core 12 and a second face sheet 110 may be bonded to a second side surface 112 of the honeycomb core 12 to form a sub-assembly 114 (numbered in FIG. 1F). That is, the honeycomb core 12 may be sandwiched between the first face sheet 106 and the second face sheet 110. The first face sheet 106 and the second face sheet 110 may be formed of a composite material, and thus, the sub-assembly 114 may be referred to as a composite sandwich part or panel. The sub-assembly 114 may be cured before moving to a venting station 116 (see FIG. 1F). Therefore, the manufacturing system 10 may include the assembly station 104 and the venting station 116.

Figure 1F:
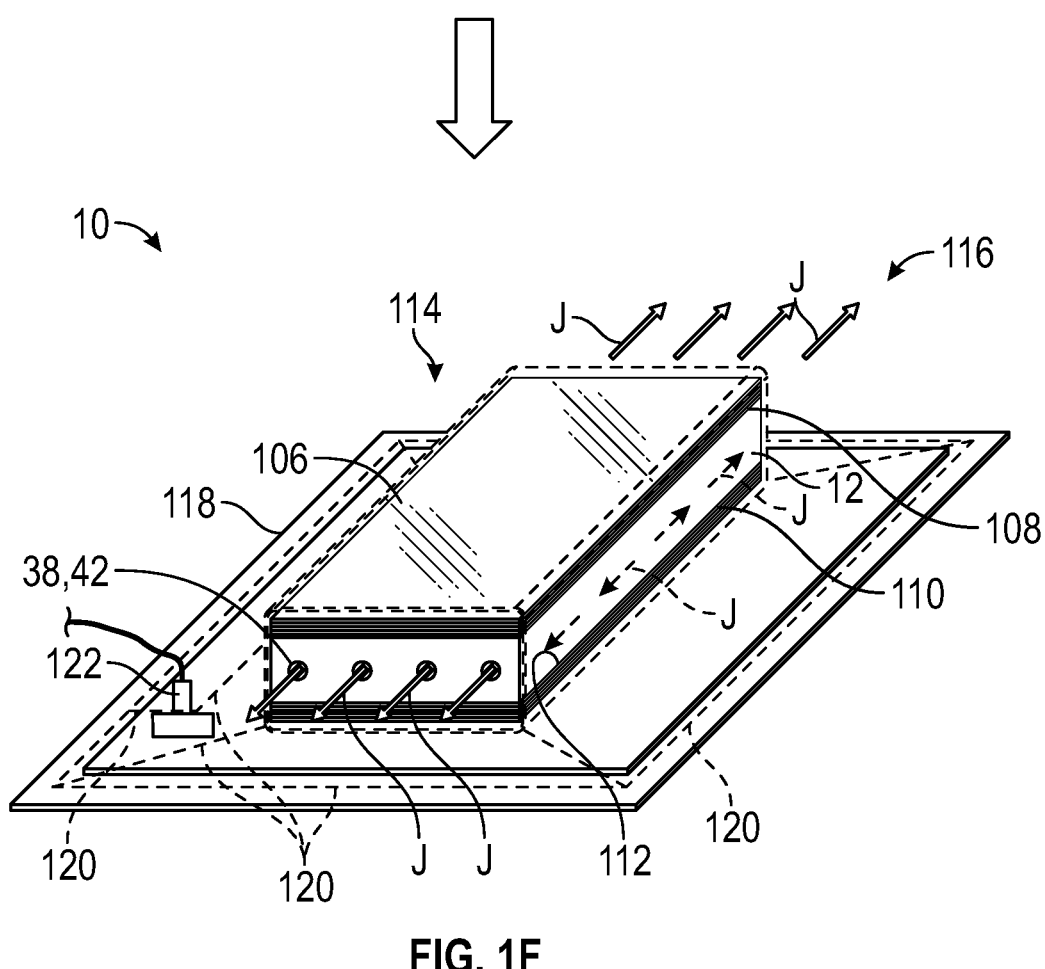
Figure 2:
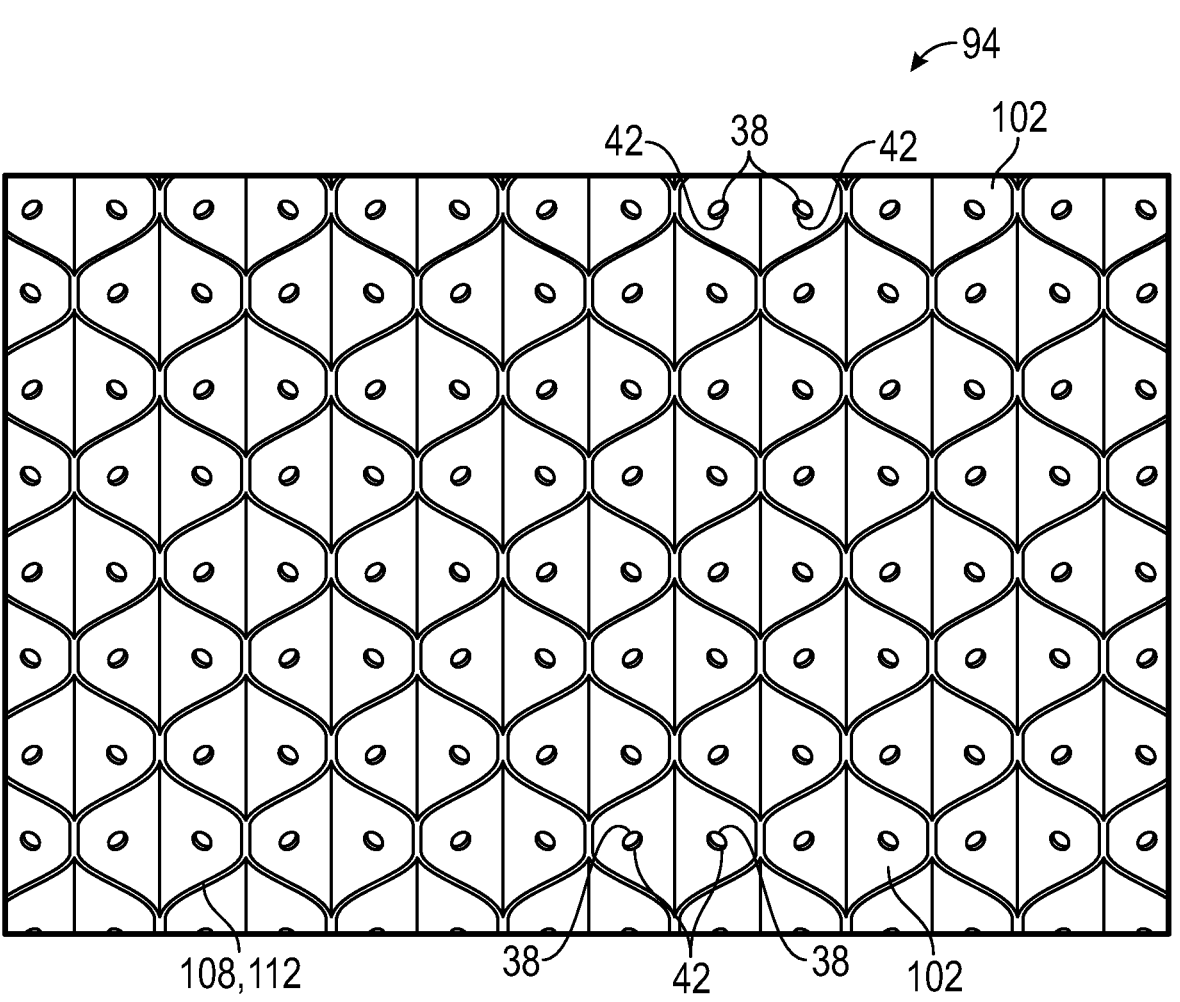
FIG. 2 is a schematic fragmented perspective view of a honeycomb panel after expanding the honeycomb panel, which illustrates holes defined in the honeycomb panel.

At the venting station 116, per FIG. 1F, the manufacturing system 10 may include a base 118 to position the sub-assembly 114 thereon, and a cover 120 disposed over the sub-assembly 114. The cover 120 is secured to the base 118 such that the sub-assembly 114 is contained between the cover 120 and the base 118. The manufacturing system 10 may also include a vacuum 122 in communication with the space inside of the cover 120 and the base 118. When the vacuum 122 is turned on, gaseous fluid is removed from the space between the cover 120 and the base 118, and gaseous fluid is removed from the sub-assembly 114 via the holes 38 through the honeycomb core 12. This process removes trapped gaseous fluids and/or volatiles from the sub-assembly 114, and thus, may assist in improving the quality of the composite sandwich part or panel. Arrows J in FIG. 1F are to generally illustrate the direction of the gaseous fluid and/or volatiles being removed from the sub-assembly 114. Also, the evenly spaced dashed lines in FIG. 1F are to illustrate the cover 120 that contains or covers the sub-assembly 114 and at least part of the vacuum 122.

As suggested above, the present disclosure also provides a method of forming the honeycomb core 12. The method may include the stations 18, 24, 30, 80, 86, 90, 96, 104, 116 discussed above, and illustrated in FIG. 1A-1F, some of which are discussed below. It is to be appreciated that the order or sequence of performing the method is for illustrative purposes and other orders or sequences are within the scope of the present teachings. It is to also be appreciated that the method may include other features not specifically identified in the description of the method below.

Referring to FIG. 1B, generally, the sheet of fibrous material 14 is fed into the perforation assembly 32A, 32B, 32C. The sheet of fibrous material 14 may have the plurality of strips of adhesive 28 applied thereon. The sheet of fibrous material 14 is perforated via the perforation assembly 32A, 32B, 32C to form the plurality of holes 38 through the sheet of fibrous material 14. The plurality of strips of adhesive 28 are applied to the sheet of fibrous material 14, and the holes 38 are spaced apart from the strips of adhesive 28. Generally, for any of the configurations herein, the strips of adhesive 28 may be applied after perforating the fibrous material 14 with the holes 38. However, alternatively, for any of the configurations herein, the strips of adhesive 28 may be applied before perforating the fibrous material 14 with the holes 38. Regardless of when the strips of adhesive 28 are applied, the holes 38 are spaced from the strips of adhesive 28.

The coating 42 is applied to the sheet of fibrous material 14 at the holes 38. That is, as the holes 38 are being formed, the coating 42 is also applied. Therefore, in certain configurations, the coating 42 is applied at the same time as the holes 38 are being formed or the coating 42 is applied immediately after forming the holes 38. As such, in certain configurations, the perforation assembly 32A, 32B, 32C is further defined as the die assembly 32A, and applying the coating 42 may include flowing an amount of the coating 42 out of the die assembly 32A as the holes 38 are punched through the sheet of fibrous material 14.

Generally, the die assembly 32A, 32B includes the male die 34A, 34B and the female die 36A, 36B, as discussed above. Feeding the sheet of fibrous material 14 into the die assembly 32A, 32B may further include feeding the sheet of fibrous material 14 between the male die 34A, 34B and the female die 36A, 36B. Therefore, perforating the sheet of fibrous material 14 may further include punching out the sheet of fibrous material 14 as the male die 34A, 34B and the female die 36A, 36B align with each other to form the holes 38.

In certain configurations, punching out the sheet of fibrous material 14 may further include rotating the first housing 48 and the second housing 52 in unison as the sheet is fed between the male punch dies 50 and the female punch dies 54 which causes one of the male punch dies 50 and one of the female punch dies 54 to align and engage each other one pair at a time to punch the sheet of fibrous material 14.

In the configuration of FIG. 3, the coating 42 may be applied to the periphery of the holes 38 via the liquid fluid 44. Therefore, applying the coating 42 may further include flowing the coating 42 out of the male die 34A or the female die 36A during punching of the sheet of fibrous material 14. As another example, applying the coating 42 may further include spraying the coating 42 on the male die 34A, the female die 36A, and/or the periphery of the holes 38. The details of applying the liquid fluid 44 to the holes 38 are discussed above, and will not be repeated.

In other configurations, the coating 42 may be applied via the film 46, such as the first film layer 66 and the second film layer 70 as discussed above. In this configuration, feeding the sheet of fibrous material 14 into the die assembly 32B may further include feeding the first film layer 66 relative to the first side 68 of the sheet of fibrous material 14 between the male die 34B and the female die 36B as the sheet of fibrous material 14 is fed between the male die 34B and the female die 36B. Also in this configuration, feeding the sheet of fibrous material 14 into the die assembly 32B may further include feeding the second film layer 70 relative to the second side 72 of the sheet of fibrous material 14 between the male die 34B and the female die 36B as the sheet of fibrous material 14 is fed between the male die 34B and the female die 36B.

When using the first film layer 66 and the second film layer 70 configuration, the method may further include kiss cutting the first film layer 66 via the female die 36B to form the first coated tabs 74 and kiss cutting the second film layer 70 via the male die 34B to form the second coated tabs 76. In certain configurations, kiss cutting the first film layer 66 and the second film layer 70 occurs simultaneously with perforating the sheet of fibrous material 14. The kiss cut does not cut the fibrous material 14, and instead only cuts the first film layer 66 and the second film layer 70 to form the first coated tabs 74 and the second coated tabs 76. Additionally, the male die 34B and the female die 36B may cooperate to punch through the first film layer 66, the second film layer 70, and the sheet of fibrous material 14 to form the holes 38 as the first coated tabs 74 and the second coated tabs 76 are being formed. That is, the kiss cutting of the first film layer 66 and the second film layer 76 forms the outer periphery of the first coated tabs 74 and the second coated tabs 76; and the anvil 55 of the male die 34B, and specifically, the anvil 55 of the male punch dies 50, forms the inner periphery of the first coated tabs 74 and the second coated tabs 76, and the holes 38 through the fibrous material 14.

Furthermore, each of the first coated tabs 74 may be adhered to the first side 68 of the sheet of fibrous material 14 around the respective holes 38 of the sheet of fibrous material 14, and similarly, the second coated tabs 76 may be adhered to the second side 72 of the sheet of fibrous material 14 around the corresponding respective holes 38 of the sheet of fibrous material 14. In certain configurations, adhering the first coated tabs 74 and the second coated tabs 76 may further include melting each of the first coated tabs 74 to the first side 68 of the sheet of fibrous material 14 around the respective holes 38 and melting each of the second coated tabs 76 to the second side 72 of the sheet of fibrous material 14 around the corresponding respective holes 38. In other configurations, adhering the first coated tabs 74 and the second coated tabs 76 may further include gluing each of the first coated tabs 74 to the first side 68 of the sheet of fibrous material 14 around the respective holes 38 and gluing each of the second coated tabs 76 to the second side 72 of the sheet of fibrous material 14 around the corresponding respective holes 38.

In other configurations, the perforation assembly 32A, 32B, 32C is further defined as the laser/applicator assembly 32C including the laser device 73 and the applicator 75. Therefore, in certain configurations, feeding the sheet of fibrous material 14 into the perforation assembly 32A, 32B, 32C further includes feeding the sheet of fibrous material 14 past the laser device 73 and the applicator 75. Also, perforating the sheet of fibrous material 14 via the perforation assembly 32A, 32B, 32C further includes perforating the sheet of fibrous material 14 via the laser device 73 to form the holes 38 through the sheet of fibrous material 14. In addition, applying the coating 42 to the sheet of fibrous material 14 at the holes 38 further includes applying the coating 42 to the sheet of fibrous material 14 at the holes 38 via the applicator 75. In certain configurations of the laser/applicator assembly 32C, applying the coating 42 to the sheet of fibrous material 14 may occur after perforating the sheet of fibrous material 14. In other configurations of the laser/applicator assembly 32C, applying the coating 42 to the sheet of fibrous material 14 may occur before perforating the sheet of fibrous material 14. When the coating 42 is applied before forming the holes 38, the coating 42 is applied to the sheet of fibrous material 14 in predetermined locations which aligns with the predetermined locations of where the holes 38 are to be formed. The coating 42 may be applied to the sheet of fibrous material 14 similarly to the way an ink jet printer applies ink to a sheet of paper. That is, the coating 42 may be ejected from the applicator 75 and applied to the sheet of fibrous material 14 in the predetermined locations, and as the sheet of fibrous material 14 continues to move, then the laser device 73 perforates the holes 38 at the locations where the coating 42 has been applied. Therefore, the spacing of the coating 42 and the placement of the holes 38 are controlled such that the coating 42 and the respective holes 38 align with each other.

The laser/applicator assembly 32C may include one or more guides that align the sheet of fibrous material 14 relative to the laser device 73 and the applicator 75 to assist with properly aligning the coating 42 and the holes 38 relative to each other in the predetermined locations. As one non-limiting example, the guides may include a sprocket that engages corresponding guide apertures along edges of the sheet of fibrous material 14. As another one non-limiting example, the guides may include an optical tracking device or a sensor that reads or recognizes corresponding targets or markings along the sheet of fibrous material 14.

In addition, the sheet of fibrous material 14 is cut to form the plurality of layers 22. In certain configurations, the sheet is fibrous material 14 is cut before the sheet of fibrous material 14 is fed into the die assembly 32A. In other configurations, the sheet of fibrous material 14 is cut after the sheet of fibrous material 14 is fed into the die assembly 32A, 32B.

Next, the layers 22 are stacked on top of each other such that the holes 38 of the layers 22 align with each other and the strips of adhesive 28 bond the respective layers 22 together to form the perforated stack 84. Therefore, the layers 22 are stacked on top of each other after the sheet of fibrous material 14 is cut. Generally, the coating 42 is applied to the sheet of fibrous material 14 at the holes 38 before the layers 22 are stacked on top of each other.

Next, the perforated stack 84 is cut to the desired width W, and then the perforated stack 84 is expanded to form the honeycomb panel 94. The perforated stack 84 is expanded after the coating 42 is applied to the holes 38.

Once the perforated stack 84 is expanded, the honeycomb panel 94 is dipped in the solution 100. As discussed above, the solution 100 adds rigidity and/or strengthens the honeycomb core 12. The coating 42 applied at the holes 38 repels the solution 100 to prevent the holes 38 from being clogged via the solution 100, and additional details about these features are discussed above and will not be repeated. The coating 42 (at the holes 38) repels the solution 100, and the solution 100 adheres to the honeycomb panel 94 except at the holes 38 where the coating 42 is applied to form the honeycomb core 12. Therefore, in certain configurations, dipping the honeycomb panel 94 in the solution 100 may further include submerging the honeycomb panel 94 in the solution 100 such that the solution 100 enters the holes 38, and thus, the solution 100 adheres to the honeycomb panel 94 except at the holes 38 where the coating 42 is applied to form the honeycomb core 12. As such, when the honeycomb panel 94 is submerged in the solution 100, the solution 100 does not adhere to the honeycomb panel 94 at the holes 38, and thus, the holes 38 remain open. Generally, applying the coating 42 to the sheet of fibrous material 14 at the holes 38 occurs before dipping the honeycomb panel 94 in the solution 100.

The honeycomb core 12 may be cured after dipping the honeycomb panel 94 in the solution 100. Then, the honeycomb core 12 may move to the assembly station 104 and then the venting station 116 but these features will not be repeated. As such, the method described herein may include other processes and stations 18, 24, 30, 80, 86, 90, 96, 104, 116 as described above.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The following Clauses provide some example configurations of the manufacturing system and the method as disclosed herein.

Clause 1: A method of forming a honeycomb core, the method comprising: feeding a sheet of fibrous material into a perforation assembly; perforating the sheet of fibrous material via the perforation assembly to form a plurality of holes through the sheet of fibrous material; applying a plurality of strips of adhesive to the fibrous material, wherein the holes are spaced apart from the strips of adhesive; cutting the sheet of fibrous material to form a plurality of layers; stacking the layers on top of each other such that the holes of the layers align with each other and the strips of adhesive bond the respective layers together to form a perforated stack; applying a coating to the sheet of fibrous material at the holes; expanding the perforated stack to form a honeycomb panel; and dipping the honeycomb panel in a solution, wherein the coating repels the solution, and wherein the solution adheres to the honeycomb panel except at the holes where the coating is applied to form the honeycomb core.

Clause 2: The method as set forth in clause 1 wherein the perforation assembly is further defined as a die assembly including a male die and a female die, and wherein feeding the sheet of fibrous material into the perforation assembly further comprises feeding the sheet of fibrous material between the male die and the female die of the die assembly.

Clause 3: The method as set forth in clause 2 wherein perforating the sheet of fibrous material further comprises punching out the sheet of fibrous material as the male die and the female die align with each other to form the holes.

Clause 4: The method as set forth in one of clauses 2 or 3 wherein applying the coating further comprises flowing the coating out of the male die or the female die during punching of the sheet of fibrous material.

Clause 5: The method as set forth in one of clauses 2-4: wherein the male die includes a first housing and a plurality of male punch dies extending out of the first housing, and the male punch dies are spaced from each other around the first housing; wherein the female die includes a second housing and a plurality of female punch dies extending out of the second housing, and the female punch dies are spaced from each other around the second housing; and wherein punching out the sheet of fibrous material further comprises rotating the first housing and the second housing in unison as the sheet is fed between the male punch dies and the female punch dies which causes one of the male punch dies and one of the female punch dies to align and engage each other one pair at a time to punch the sheet of fibrous material.

Clause 6: The method as set forth in clause 2 wherein the coating includes a first film layer and a second film layer, and wherein: feeding the sheet of fibrous material into the perforation assembly further comprises feeding the first film layer relative to a first side of the sheet of fibrous material between the male die and the female die as the sheet of fibrous material is fed between the male die and the female die; and feeding the sheet of fibrous material into the perforation assembly further comprises feeding the second film layer relative to a second side of the sheet of fibrous material between the male die and the female die as the sheet of fibrous material is fed between the male die and the female die.

Clause 7: The method as set forth in clause 6 further comprising kiss cutting the first film layer via the female die to form first coated tabs and kiss cutting the second film layer via the male die to form second coated tabs, wherein kiss cutting the first film layer and the second film layer occurs simultaneously with perforating the sheet of fibrous material.

Clause 8: The method as set forth in one of clauses 6 or 7 further comprising adhering each of the first coated tabs to the first side of the sheet of fibrous material around the respective holes of the sheet of fibrous material, and adhering the second coated tabs to the second side of the sheet of fibrous material around the corresponding respective holes of the sheet of fibrous material.

Clause 9: The method as set forth in one of clauses 6-8 wherein adhering the first coated tabs and the second coated tabs further comprises melting each of the first coated tabs to the first side of the sheet of fibrous material around the respective holes and melting each of the second coated tabs to the second side of the sheet of fibrous material around the corresponding respective holes.

Clause 10: The method as set forth in one of clauses 6-8 wherein adhering the first coated tabs and the second coated tabs further comprises gluing each of the first coated tabs to the first side of the sheet of fibrous material around the respective holes and gluing each of the second coated tabs to the second side of the sheet of fibrous material around the corresponding respective holes.

Clause 11: The method as set forth in clause 1 wherein applying the coating to the sheet of fibrous material at the holes occurs before dipping the honeycomb panel in the solution.

Clause 12: The method as set forth in clause 11 wherein applying the coating includes flowing an amount of the coating out of the perforation assembly as the holes are punched through the sheet of fibrous material.

Clause 13: The method as set forth in one of clauses 11 or 12 wherein the coating is a liquid fluid.

Clause 14: The method as set forth in clause 11 wherein the coating is a film.

Clause 15: The method as set forth in clause 1 wherein the perforation assembly is further defined as a laser/applicator assembly including a laser device and an applicator, and wherein feeding the sheet of fibrous material into the perforation assembly further comprises feeding the sheet of fibrous material past the laser device and the applicator, wherein perforating the sheet of fibrous material via the perforation assembly further comprises perforating the sheet of fibrous material via the laser device to form the holes through the sheet of fibrous material, and wherein applying the coating to the sheet of fibrous material at the holes further comprises applying the coating to the sheet of fibrous material at the holes via the applicator.

Clause 16: The method as set forth in clause 15 wherein applying the coating to the sheet of fibrous material occurs after perforating the sheet of fibrous material.

Clause 17: The method as set forth in clause 15 wherein applying the coating to the sheet of fibrous material occurs before perforating the sheet of fibrous material.

Clause 18: The method as set forth in any one of the preceding clauses wherein applying the coating to the sheet of fibrous material at the holes occurs before stacking the layers on top of each other.

Clause 19: The method as set forth in any one of the preceding clauses wherein dipping the honeycomb panel in the solution further comprises submerging the honeycomb panel in the solution such that the solution enters the holes, wherein the solution adheres to the honeycomb panel except at the holes where the coating is applied to form the honeycomb core.

Clause 20: The method as set forth in any one of the preceding clauses wherein the sheet of fibrous material is further defined as a non-metallic paper, the solution is further defined as a phenolic resin, and the coating is further defined as a phenolic-repellant coating.

Clause 21: A manufacturing system to form a honeycomb core, the system comprising: a perforation assembly configured to receive a sheet of fibrous material and perforate the sheet of fibrous material to form a plurality of holes through the sheet of fibrous material, wherein the sheet of fibrous material has a plurality of strips of adhesive thereon, and the holes are spaced apart from the strips of adhesive; a cutting apparatus configured to cut the sheet of fibrous material to form a plurality of layers; a stacking apparatus configured to stack the layers on top of each other such that the holes of the layers align with each other and the strips of adhesive bond the respective layers together to form a perforated stack; a coating applied to the sheet of fibrous material at the holes; an expansion apparatus configured to expand the perforated stack to form a honeycomb panel; and a container configured to contain a solution and receive the honeycomb panel, wherein the coating repels the solution, and wherein the solution adheres to the honeycomb panel except at the holes where the coating is applied to form the honeycomb core.

Clause 22: The manufacturing system as set forth in clause 21 wherein the perforation assembly is further defined as a die assembly including a male die and a female die, wherein the sheet of fibrous material is fed into the die assembly between the male die and the female die to perforate the sheet of fibrous material to form the holes through the sheet of fibrous material, and wherein at least one of the male die and the female die includes an outlet configured to allow the coating to exit out of the at least one of the male die and the female die during punching of the sheet of fibrous material such that the coating is applied to the sheet of fibrous material at the holes.

Clause 23: The manufacturing system as set forth in clause 21 wherein the perforation assembly is further defined as a die assembly including a male die and a female die, and wherein the coating includes a first film layer fed between the male die and the female die relative to a first side of the sheet of fibrous material, and the coating includes a second film layer fed between the male die and the female die relative to a second side of the sheet of fibrous material, wherein the perforation assembly is configured to cut the first film layer, the second film layer, and the sheet of fibrous material such that a cut portion of the first film layer and a cut portion of the second film layer is applied to the sheet of fibrous material at the holes.

Clause 24: The manufacturing system as set forth in clause 21 wherein the perforation assembly is further defined as a laser/applicator assembly including a laser device configured to perforate the sheet of fibrous material to form the holes through the sheet of fibrous material and an applicator configured to apply the coating to the sheet of fibrous material at the holes.

Clause 25: The method as set forth in any one of clauses 1-10 or 15-20 wherein applying the coating to the sheet of fibrous material at the holes occurs before dipping the honeycomb panel in the solution.

What is claimed is:

1. A method of forming a honeycomb core, the method comprising:

feeding a sheet of fibrous material into a perforation assembly;

perforating the sheet of fibrous material via the perforation assembly to form a plurality of holes through the sheet of fibrous material;

applying a plurality of strips of adhesive to the fibrous material, wherein the holes are spaced apart from the strips of adhesive;

cutting the sheet of fibrous material to form a plurality of layers;

stacking the layers on top of each other such that the holes of the layers align with each other and the strips of adhesive bond the respective layers together to form a perforated stack;

applying a coating to the sheet of fibrous material at the holes;

expanding the perforated stack to form a honeycomb panel, wherein applying the coating to the sheet of fibrous material at the holes occurs before dipping the honeycomb panel in a solution, and wherein applying the coating includes flowing an amount of the coating out of the perforation assembly as the holes are punched through the sheet of fibrous material; and dipping the honeycomb panel in the solution, wherein the coating repels the solution, and wherein the solution adheres to the honeycomb panel except at the holes where the coating is applied to form the honeycomb core.

2. The method as set forth in claim 1 wherein the perforation assembly is further defined as a die assembly including a male die and a female die, and wherein feeding the sheet of fibrous material into the perforation assembly further comprises feeding the sheet of fibrous material between the male die and the female die of the die assembly.

3. The method as set forth in claim 2 wherein perforating the sheet of fibrous material further comprises punching out the sheet of fibrous material as the male die and the female die align with each other to form the holes.

4. The method as set forth in claim 3 wherein applying the coating further comprises flowing the coating out of the male die or the female die during punching of the sheet of fibrous material.

5. The method as set forth in claim 3:

wherein the male die includes a first housing and a plurality of male punch dies extending out of the first housing, and the male punch dies are spaced from each other around the first housing;

wherein the female die includes a second housing and a plurality of female punch dies extending out of the second housing, and the female punch dies are spaced from each other around the second housing; and wherein punching out the sheet of fibrous material further comprises rotating the first housing and the second housing in unison as the sheet is fed between the male punch dies and the female punch dies which causes one of the male punch dies and one of the female punch dies to align and engage each other one pair at a time to punch the sheet of fibrous material.

6. The method as set forth in claim 2 wherein the coating includes a first film layer and a second film layer, and wherein:

feeding the sheet of fibrous material into the perforation assembly further comprises feeding the first film layer relative to a first side of the sheet of fibrous material between the male die and the female die as the sheet of fibrous material is fed between the male die and the female die; and feeding the sheet of fibrous material into the perforation assembly further comprises feeding the second film layer relative to a second side of the sheet of fibrous material between the male die and the female die as the sheet of fibrous material is fed between the male die and the female die.

7. The method as set forth in claim 6 further comprising kiss cutting the first film layer via the female die to form first coated tabs and kiss cutting the second film layer via the male die to form second coated tabs, wherein kiss cutting the first film layer and the second film layer occurs simultaneously with perforating the sheet of fibrous material.

8. The method as set forth in claim 7 further comprising adhering each of the first coated tabs to the first side of the sheet of fibrous material around the respective holes of the sheet of fibrous material, and adhering the second coated tabs to the second side of the sheet of fibrous material around the corresponding respective holes of the sheet of fibrous material.

9. The method as set forth in claim 8 wherein adhering the first coated tabs and the second coated tabs further comprises melting each of the first coated tabs to the first side of the sheet of fibrous material around the respective holes and melting each of the second coated tabs to the second side of the sheet of fibrous material around the corresponding respective holes.

10. The method as set forth in claim 8 wherein adhering the first coated tabs and the second coated tabs further comprises gluing each of the first coated tabs to the first side of the sheet of fibrous material around the respective holes and gluing each of the second coated tabs to the second side of the sheet of fibrous material around the corresponding respective holes.

11. The method as set forth in claim 1 wherein the coating is a liquid fluid.

12. The method as set forth in claim 1 wherein the coating is a film.

13. The method as set forth in claim 1 wherein the perforation assembly is further defined as a laser/applicator assembly including a laser device and an applicator, and wherein feeding the sheet of fibrous material into the perforation assembly further comprises feeding the sheet of fibrous material past the laser device and the applicator, wherein perforating the sheet of fibrous material via the perforation assembly further comprises perforating the sheet of fibrous material via the laser device to form the holes through the sheet of fibrous material, and wherein applying the coating to the sheet of fibrous material at the holes further comprises applying the coating to the sheet of fibrous material at the holes via the applicator.

14. The method as set forth in claim 13 wherein applying the coating to the sheet of fibrous material occurs after perforating the sheet of fibrous material.

15. The method as set forth in claim 13 wherein applying the coating to the sheet of fibrous material occurs before perforating the sheet of fibrous material.

16. The method as set forth in claim 1 wherein applying the coating to the sheet of fibrous material at the holes occurs before stacking the layers on top of each other.

17. The method as set forth in claim 1 wherein dipping the honeycomb panel in the solution further comprises submerging the honeycomb panel in the solution such that the solution enters the holes, wherein the solution adheres to the honeycomb panel except at the holes where the coating is applied to form the honeycomb core.

18. The method as set forth in claim 1 wherein the sheet of fibrous material is further defined as a non-metallic paper, the solution is further defined as a phenolic resin, and the coating is further defined as a phenolic-repellant coating.

19. A manufacturing system to form a honeycomb core, the system comprising:

a perforation assembly configured to receive a sheet of fibrous material and perforate the sheet of fibrous material to form a plurality of holes through the sheet of fibrous material, wherein the sheet of fibrous material has a plurality of strips of adhesive thereon, and the holes are spaced apart from the strips of adhesive, wherein the perforation assembly is further defined as a die assembly including a male die and a female die, wherein the sheet of fibrous material is fed into the die assembly between the male die and the female die to perforate the sheet of fibrous material to form the holes through the sheet of fibrous material, and wherein at least one of the male die and the female die includes an outlet configured to allow coating to exit out of the at least one of the male die and the female die during punching of the sheet of fibrous material such that the coating is applied to the sheet of fibrous material at the holes;

a cutting apparatus configured to cut the sheet of fibrous material to form a plurality of layers;

a stacking apparatus configured to stack the layers on top of each other such that the holes of the layers align with each other and the strips of adhesive bond the respective layers together to form a perforated stack;

the coating applied to the sheet of fibrous material at the holes;

an expansion apparatus configured to expand the perforated stack to form a honeycomb panel; and a container configured to contain a solution and receive the honeycomb panel, wherein the coating repels the solution, and wherein the solution adheres to the honeycomb panel except at the holes where the coating is applied to form the honeycomb core.

20. The manufacturing system as set forth in claim 19 wherein the perforation assembly is further defined as a die assembly including a male die and a female die, and wherein the coating includes a first film layer fed between the male die and the female die relative to a first side of the sheet of fibrous material, and the coating includes a second film layer fed between the male die and the female die relative to a second side of the sheet of fibrous material, wherein the perforation assembly is configured to cut the first film layer, the second film layer, and the sheet of fibrous material such that a cut portion of the first film layer and a cut portion of the second film layer is applied to the sheet of fibrous material at the holes.

21. The manufacturing system as set forth in claim 19 wherein the perforation assembly is further defined as a laser/applicator assembly including a laser device configured to perforate the sheet of fibrous material to form the holes through the sheet of fibrous material and an applicator configured to apply the coating to the sheet of fibrous material at the holes.

22. The method as set forth in claim 1 wherein the holes are aligned when stacking the layers.

23. The method as set forth in claim 1 wherein the coating adheres to the fibrous material at the holes.

24. The manufacturing system as set forth in claim 19 wherein the holes are aligned when stacking the layers.

\* \* \* \* \*